(12) United States Patent
Gschwind et al.

(10) Patent No.: US 10,078,515 B2
(45) Date of Patent: *Sep. 18, 2018

(54) TRACKING OPERAND LIVENESS INFORMATION IN A COMPUTER SYSTEM AND PERFORMING FUNCTION BASED ON THE LIVENESS INFORMATION

(75) Inventors: Michael K Gschwind, Chappaqua, NY (US); Valentina Salapura, Chappaqua, NY (US)

(73) Assignee: International Business Machines Corporation, Armonk, NY (US)

(*) Notice: Subject to any disclaimer, the term of this patent is extended or adjusted under 35 U.S.C. 154(b) by 989 days.

This patent is subject to a terminal disclaimer.

(21) Appl. No.: 13/251,441

(22) Filed: Oct. 3, 2011

(65) Prior Publication Data

US 2013/0086367 A1 Apr. 4, 2013

(51) Int. Cl.
| | |
|---|---|
| *G06F 9/30* | (2006.01) |
| *G06F 9/38* | (2006.01) |
| *G06F 9/40* | (2006.01) |
| *G06F 9/46* | (2006.01) |

(52) U.S. Cl.
CPC ........ *G06F 9/3834* (2013.01); *G06F 9/30076* (2013.01); *G06F 9/30105* (2013.01); *G06F 9/30127* (2013.01); *G06F 9/30185* (2013.01); *G06F 9/384* (2013.01); *G06F 9/3832* (2013.01); *G06F 9/3851* (2013.01); *G06F 9/3855* (2013.01); *G06F 9/462* (2013.01)

(58) Field of Classification Search
CPC ........................................ G06F 9/462
USPC ........................................ 712/228
See application file for complete search history.

(56) References Cited

U.S. PATENT DOCUMENTS

| | | | |
|---|---|---|---|
| 5,095,526 A | | 3/1992 | Baum |
| 5,303,358 A | * | 4/1994 | Baum ........................... 712/226 |
| 5,414,864 A | * | 5/1995 | Koizumi ....................... 712/228 |
| 5,737,629 A | | 4/1998 | Zuraski, Jr. et al. |

(Continued)

FOREIGN PATENT DOCUMENTS

| | | |
|---|---|---|
| CN | 1488096 A | 4/2004 |
| CN | 1856770 A | 11/2006 |

(Continued)

OTHER PUBLICATIONS

Zyuban et al. "Inherently Lower-Power High-Performance Superscalar Architectures", IEEE Transactions on Computers, vol. 50, No. 3, Mar. 2001, pp. 268-285.

(Continued)

*Primary Examiner* — Yuqing Xiao
(74) *Attorney, Agent, or Firm* — Steven Chiu; William A. Kinnaman, Jr.

(57) ABSTRACT

Operand liveness state information is maintained during context switches for current architected operands of executing programs. The current operand state information indicates whether corresponding current operands are enabled or disabled for use by a first program module comprising machine instructions of an instruction set architecture (ISA) for disabling current architected operands. A machine instruction of the first program module accesses a current operand by using the current operand state information to determine whether a previously stored current operand value is accessible by the first program module.

7 Claims, 14 Drawing Sheets

(56) References Cited

U.S. PATENT DOCUMENTS

| | | | |
|---|---|---|---|
| 5,944,810 A | 8/1999 | Cherabuddi | |
| 6,094,719 A | 7/2000 | Panwar | |
| 6,189,088 B1 | 2/2001 | Gschwind | |
| 6,199,156 B1* | 3/2001 | Yoder et al. | 712/228 |
| 6,308,258 B1 | 10/2001 | Kubota et al. | |
| 6,314,511 B2 | 11/2001 | Levy et al. | |
| 6,393,579 B1 | 5/2002 | Piazza | |
| 6,449,710 B1 | 9/2002 | Isaman | |
| 6,687,806 B1 | 2/2004 | McGrath | |
| 6,748,519 B1 | 6/2004 | Moore | |
| 6,950,926 B1 | 9/2005 | Menezes | |
| 7,131,017 B2 | 10/2006 | Schmit et al. | |
| 7,228,403 B2 | 6/2007 | Leber et al. | |
| 7,487,338 B2 | 2/2009 | Matsuo | |
| 7,500,126 B2 | 3/2009 | Terechko et al. | |
| 7,669,038 B2 | 2/2010 | Burky et al. | |
| 7,676,653 B2 | 3/2010 | May | |
| 7,739,442 B2 | 6/2010 | Gonion | |
| 7,739,482 B2 | 6/2010 | Nguyen et al. | |
| 7,769,885 B1 | 8/2010 | Kompella | |
| 7,805,536 B1 | 9/2010 | Kompella | |
| 7,975,134 B2 | 7/2011 | Gonion | |
| 2001/0004755 A1* | 6/2001 | Levy et al. | 712/217 |
| 2002/0124155 A1 | 9/2002 | Sami et al. | |
| 2003/0154419 A1 | 8/2003 | Zang et al. | |
| 2004/0059895 A1* | 3/2004 | May et al. | 712/223 |
| 2004/0064680 A1 | 4/2004 | Kadambi et al. | |
| 2005/0251662 A1 | 11/2005 | Samra | |
| 2006/0174089 A1 | 8/2006 | Altman et al. | |
| 2006/0190710 A1 | 8/2006 | Rychlik | |
| 2007/0022428 A1* | 1/2007 | Yamasaki | 718/108 |
| 2008/0016324 A1* | 1/2008 | Burky et al. | 712/217 |
| 2008/0022044 A1 | 1/2008 | Nunamaker et al. | |
| 2008/0133893 A1 | 6/2008 | Glew | |
| 2008/0148022 A1 | 6/2008 | Piry et al. | |
| 2009/0019257 A1 | 1/2009 | Shen et al. | |
| 2009/0019263 A1 | 1/2009 | Shen et al. | |
| 2009/0055631 A1 | 2/2009 | Burky et al. | |
| 2009/0089562 A1* | 4/2009 | Schuchman et al. | 712/228 |
| 2009/0198986 A1 | 8/2009 | Kissell | |
| 2010/0095286 A1 | 4/2010 | Kaplan | |
| 2010/0312991 A1 | 12/2010 | Norden et al. | |
| 2010/0332803 A1 | 12/2010 | Yoshida et al. | |
| 2011/0087865 A1 | 4/2011 | Barrick et al. | |
| 2011/0099333 A1 | 4/2011 | Sprangle et al. | |
| 2011/0161616 A1 | 6/2011 | Tarjan et al. | |
| 2012/0005461 A1* | 1/2012 | Moir et al. | 712/228 |

FOREIGN PATENT DOCUMENTS

| | | |
|---|---|---|
| EP | 0725334 | 8/1996 |
| JP | S61235985 A | 10/1986 |
| JP | H0353328 | 3/1991 |
| JP | 05173788 A | 7/1993 |
| JP | H064305 A | 1/1994 |
| JP | H06348509 A | 12/1994 |
| JP | H07248897 A | 9/1995 |
| JP | H0887420 A | 4/1996 |
| JP | 10283188 A | 10/1998 |
| JP | 2007304663 | 11/2007 |
| JP | 2007304663 A1 | 11/2007 |
| WO | WO03102723 A2 | 12/2003 |
| WO | WO2007021888 | 2/2007 |

OTHER PUBLICATIONS

Franklin et al. "Register Traffic Analysis for Streamlining Inter-Operation Communication in Fine-Grain Parallel Processors", IEEE, SIGMICRO Newsletter Dec. 23, 1992, pp. 236-245.

Ponomarev et al. "Isolating Short-Lived Operands for Energy Reduction", IEEE Transactions on Computers, vol. 53, No. 6, Jun. 2004, pp. 697-709.

Lozano et al. "Exploiting Short-Lived Variables in Superscalar Processors", 1995 Proceedings of MICRO-28, pp. 292-302.

Shrivastava et al. "Compilation Framework for Code Size Reduction Using Reduced Bit-Width ISAs", ACM Transactions on Design Automation of Electronic Systems, vol. 11, Issue 1, Jan. 2006.

Bednarski et al. "Energy-Optimal Integrated VLIW Code Generation", Proceedings of 11th Workshop on Compilers for Parallel Computers, 2004, pp. 1-14.

Zeng et al. "Register File Caching for Energy Efficiency", 2010 43rd Annual IEEE ACM International Symposium on Microarchitecture (MICRO), Dec. 2010, pp. 301-312.

Tan et al. "Register Caching as a Way of Mitigating Intercluster Communication Penalties in Clustered Microarchtectures", 2008 International Conference on Computing and Electrical Engineering, Dec. 2008, pp. 194-198.

Shioya et al. "Register Cache System not for Latency Reduction Purpose", 2010 43rd Annual IEEE ACM International Symposium on Microarchitecture, Dec. 2010, pp. 301-312.

Cruz et al. "Multiple-Banked Register File Architecture", Proceedings of the 27th International Symposium on Computer Architecture, Jun. 2000, pp. 316-325.

Butts et al. "Use-Based Register Caching with Decoupled Indexing", Proceedings of the 31st Annual Symposium on Computer Architecture, Jun. 2004, pp. 1-12.

Martin et al. "Exploiting Dead Value Information", IEEE Proceedings of Micro-30, Dec. 1997, pp. 1-11.

Hampton "Exposing Datapath Elements to Reduce Microprocessor Energy Consumption", MIT Thesis, Jun. 2001, pp. 1-80.

Vo et al. "Enhance Up to 40% Performance of SH-4A Processor by Using Prefix Instruction", Solid-State and Integrated Circuit Technology, 2010 10th IEEE International Conference on Circuit Technology, pp. 360-362.

Gschwind et al "Dynamic and Transparent Binary Translation", IEEE Computer, Mar. 2000, pp. 54-59.

Ebcioglu et al. "Optimizations and Oracle Parallelism with Dynamic Translation", Proceeding MICRO 32 Proceedings of the 32nd annual ACM/IEEE international symposium on Microarchitecture, 1999, pp. 1-12.

IA-32 Intel Architecture Software Developer's Manual, vol. 3: System Programming Guide, pp. 2-12 through 2-15, 2003.

International Search Report and Written Opinion mailed Feb. 12, 2013, PCT/IB2012/055070.

G. Savaransky et al, "Lazy Retirement: A Power Aware Register Management Mechanism", Workshop on Complexity Efficient Design, 2002, pp. 1-9.

Savransky et all "Lazy Retirement: A Power Aware Register Management Mechanism", Workshop on Complexity Efficient Design, 2002, pp. 1-9.

U.S. Appl. No. 14/100,077, filed Dec. 9, 2013 to Gschwind et al, Office Action dated Apr. 8, 2014.

IBM Power ISA Version 2.06, Revision B, Jul. 23, 2010, pp. cover-1313.

z/Architecture Principles of Operation, SA22-7832-08, 9th Edition, Aug. 2010, pp. 1-1496.

Microarchitectural Support for Speculative Register Naming, by Jesus Alastruey et al, published in Parallel and Distributed Processing Symposium, Mar. 1, 2007, 10 pgs., IEEE.

W003102723 A2 (Motorola Inc (US)) Dec. 11, 2003, p. 5, line 20-p. 6, line 13; p. 7, line 14-p. 9, line 12; p. 11, line 26-p. 13, line 25; p. 15, line 8-line 17.

Microarchitectural Support for Speculative Register Renaming, Authors: Jesus Alastruey, Teresa Monreal, Victor Vinals, Mateo Valero, Publication data: Parallel and Distributed Processing Symposium, 2007, IPDPS 2007, IEEE International, Mar. 1, 2007 IEEE, Pi, Source Info: p. 1-10.

JPN6016008586; Intel Corporation: "IA32 Intel (R) Architecture Software Developer's Manual vol. 2: Set Reference", 2003, 3-446-3-447, Intel Corporation Instruction.

JPH064305 A (NEC Corp) Jan. 4, 1994.

JPS61235985 A (NEC Corp) Oct. 21, 1986.

U.S. Appl. No. 14/100,077, filed Dec. 2, 2013 to Michael K. Gschwind et al., Final Office Action dated Apr. 5, 2016.

(56) References Cited

OTHER PUBLICATIONS

U.S. Appl. No. 14/100,077, filed Dec. 2, 2013 to Michael K. Gschwind et al., Advisory Action dated Jan. 7, 2015.
U.S. Appl. No. 14/100,077, filed Dec. 2, 2013 to Michael K. Gschwind et al., Office Action dated Dec. 4, 2015.
U.S. Appl. No. 14/100,077, filed Dec. 2, 2013 to Michael K. Gschwind et al., Final Office Action dated Sep. 19, 2014.
U.S. Appl. No. 14/100,077, filed Dec. 2, 2013 to Michael K. Gschwind et al., Notice of Allowance dated Sep. 27, 2017.
JPN6016008584; Intel Corporation: "IA32 Intel (R) Architecture Software Developer's Manual vol. 3: System Programming Guide", 2003, 2-12-2-15, 5-14-5-19, Intel Corporation.

* cited by examiner mfspr
Move from Special-Purpose Register (x7C00 02A6')
mfspr rD,SPR

☐ Reserved

| 31 | D | spr* | 339 | 0 |
|---|---|---|---|---|
| 0 | 5 6 | 10 11 | 20 21 | 30 31 |

NOTE:*This is a split field.
n ← spr [5-9] || spr [0-4]
rD ← SPR (n)

FIG.9

*Store Doubleword*                                     *DS-form* std          RS,DS(RA)

| 62 | RS | RA | DS | 0 |
|---|---|---|---|---|
| 0 | 6 | 11 | 16 | 30  31 | if RA = 0 then b ← 0
else              b ← (RA)
EA ← b + EXTS (DS || 0b00)
MEM (EA, 8) ← (RS)

Let the effective address (EA) be the sum (RA|0)+ (DS||0b00). (RS) is stored into the doubleword in storage addressed by EA.

Special Registers Altered:
None

FIG.10

*Move From Special Purpose Register*
*XFX-form* mfspr            RT,SPR

| 31 | RT | spr | 339 | / |
|---|---|---|---|---|
| 0 | 6 | 11 | 21 | 31 | n ← spr5:9 ∥ spr0:4
if length(SPR(n)) = 64 then
RT ← SPR(n)
else
RT ← 320 ∥ SPR(n)

FIG.11

*Move From Special Purpose Register*
                                     *XFX-form* mtspr          SPR,RS

| 31 | RS | spr | 467 | / |
|---|---|---|---|---|
| 0 | 6 | 11 | 21 | 31 | n ← spr5:9 || spr0:4
if n = 13 then see Book III-S (Power ISA™ Version 2.06 Revision B)
else
if length(SPR(n)) = 64 then
SPR(n) ← (RS)
else
SPR(n) ← (RS)32:63

FIG.12

TRACKING OPERAND LIVENESS INFORMATION IN A COMPUTER SYSTEM AND PERFORMING FUNCTION BASED ON THE LIVENESS INFORMATION

FIELD OF THE INVENTION

The present disclosure relates to the field of processors and, more particularly, to performing operations based on operand liveness in a computer system.

BACKGROUND

According to Wikipedia, published Aug. 1, 2011 on the World Wide Web, "Multithreading Computers" have hardware support to efficiently execute multiple threads. These are distinguished from multiprocessing systems (such as multi-core systems) in that the threads have to share the resources of a single core: the computing units, the CPU caches and the translation look-aside buffer (TLB). Where multiprocessing systems include multiple complete processing units, multithreading aims to increase utilization of a single core by using thread-level as well as instruction-level parallelism. As the two techniques are complementary, they are sometimes combined in systems with multiple multithreading CPUs and in CPUs with multiple multithreading cores.

The Multithreading paradigm has become more popular as efforts to further exploit instruction level parallelism have stalled since the late-1990s. This allowed the concept of Throughput Computing to re-emerge to prominence from the more specialized field of transaction processing:

Even though it is very difficult to further speed up a single thread or single program, most computer systems are actually multi-tasking among multiple threads or programs.

Techniques that would allow speed up of the overall system throughput of all tasks would be a meaningful performance gain.

The two major techniques for throughput computing are multiprocessing and multithreading.

Some advantages include:

If a thread gets a lot of cache misses, the other thread(s) can continue, taking advantage of the unused computing resources, which thus can lead to faster overall execution, as these resources would have been idle if only a single thread was executed.

If a thread cannot use all the computing resources of the CPU (because instructions depend on each other's result), running another thread permits to not leave these idle.

If several threads work on the same set of data, they can actually share their cache, leading to better cache usage or synchronization on its values.

Some criticisms of multithreading include:

Multiple threads can interfere with each other when sharing hardware resources such as caches or translation look-aside buffers (TLBs).

Execution times of a single thread are not improved but can be degraded, even when only one thread is executing. This is due to slower frequencies and/or additional pipeline stages that are necessary to accommodate thread-switching hardware.

Hardware support for multithreading is more visible to software, thus requiring more changes to both application programs and operating systems than Multiprocessing.

Types of multithreading:

Block Multi-Threading Concept

The simplest type of multi-threading occurs when one thread runs until it is blocked by an event that normally would create a long latency stall. Such a stall might be a cache-miss that has to access off-chip memory, which might take hundreds of CPU cycles for the data to return. Instead of waiting for the stall to resolve, a threaded processor would switch execution to another thread that was ready to run. Only when the data for the previous thread had arrived, would the previous thread be placed back on the list of ready-to-run threads.

For example:

1. Cycle i: instruction j from thread A is issued
2. Cycle i+1: instruction j+1 from thread A is issued
3. Cycle i+2: instruction j+2 from thread A is issued, load instruction which misses in all caches
4. Cycle i+3: thread scheduler invoked, switches to thread B
5. Cycle i+4: instruction k from thread B is issued
6. Cycle i+5: instruction k+1 from thread B is issued Conceptually, it is similar to cooperative multi-tasking used in real-time operating systems in which tasks voluntarily give up execution time when they need to wait upon some type of the event.

This type of multi threading is known as Block or Cooperative or Coarse-grained multithreading.

Hardware Cost

The goal of multi-threading hardware support is to allow quick switching between a blocked thread and another thread ready to run. To achieve this goal, the hardware cost is to replicate the program visible registers as well as some processor control registers (such as the program counter). Switching from one thread to another thread means the hardware switches from using one register set to another.

Such additional hardware has these benefits:

The thread switch can be done in one CPU cycle.

It appears to each thread that it is executing alone and not sharing any hardware resources with any other threads. This minimizes the amount of software changes needed within the application as well as the operating system to support multithreading.

In order to switch efficiently between active threads, each active thread needs to have its own register set. For example, to quickly switch between two threads, the register hardware needs to be instantiated twice.

EXAMPLES

Many families of microcontrollers and embedded processors have multiple register banks to allow quick context switching for interrupts. Such schemes can be considered a type of block multithreading among the user program thread and the interrupt threads Interleaved Multi-Threading 1. Cycle i+1: an instruction from thread B is issued
2. Cycle i+2: an instruction from thread C is issued The purpose of this type of multithreading is to remove all data dependency stalls from the execution pipeline. Since one thread is relatively independent from other threads, there's less chance of one instruction in one pipe stage needing an output from an older instruction in the pipeline.

Conceptually, it is similar to pre-emptive multi-tasking used in operating systems. One can make the analogy that the time-slice given to each active thread is one CPU cycle.

This type of multithreading was first called Barrel processing, in which the staves of a barrel represent the pipeline stages and their executing threads. Interleaved or Pre-emptive or Fine-grained or time-sliced multithreading are more modern terminology.

Hardware Costs

In addition to the hardware costs discussed in the Block type of multithreading, interleaved multithreading has an additional cost of each pipeline stage tracking the thread ID of the instruction it is processing. Also, since there are more threads being executed concurrently in the pipeline, shared resources such as caches and TLBs need to be larger to avoid thrashing between the different threads.

Simultaneous Multi-Threading

Concept

The most advanced type of multi-threading applies to superscalar processors. A normal superscalar processor issues multiple instructions from a single thread every CPU cycle. In Simultaneous Multi-threading (SMT), the superscalar processor can issue instructions from multiple threads every CPU cycle. Recognizing that any single thread has a limited amount of instruction level parallelism, this type of multithreading tries to exploit parallelism available across multiple threads to decrease the waste associated with unused issue slots.

For example:

1. Cycle i: instructions j and j+1 from thread A; instruction k from thread B all simultaneously issued
2. Cycle i+1: instruction j+2 from thread A; instruction k+1 from thread B; instruction m from thread C all simultaneously issued
3. Cycle i+2: instruction j+3 from thread A; instructions m+1 and m+2 from thread C all simultaneously issued.

To distinguish the other types of multithreading from SMT, the term Temporal multithreading is used to denote when instructions from only one thread can be issued at a time.

Hardware Costs

In addition to the hardware costs discussed for interleaved multithreading, SMT has the additional cost of each pipeline stage tracking the Thread ID of each instruction being processed. Again, shared resources such as caches and TLBs have to be sized for the large number of active threads.

According to U.S. Pat. No. 7,827,388 "Apparatus for adjusting instruction thread priority in a multi-thread processor" issued Nov. 2, 2010, a assigned to IBM and incorporated by reference herein, a number of techniques are used to improve the speed at which data processors execute software programs. These techniques include increasing the processor clock speed, using cache memory, and using predictive branching. Increasing the processor clock speed allows a processor to perform relatively more operations in any given period of time. Cache memory is positioned in close proximity to the processor and operates at higher speeds than main memory, thus reducing the time needed for a processor to access data and instructions. Predictive branching allows a processor to execute certain instructions based on a prediction about the results of an earlier instruction, thus obviating the need to wait for the actual results and thereby improving processing speed.

Some processors also employ pipelined instruction execution to enhance system performance. In pipelined instruction execution, processing tasks are broken down into a number of pipeline steps or stages. Pipelining may increase processing speed by allowing subsequent instructions to begin processing before previously issued instructions have finished a particular process. The processor does not need to wait for one instruction to be fully processed before beginning to process the next instruction in the sequence.

Processors that employ pipelined processing may include a number of different pipeline stages which are devoted to different activities in the processor. For example, a processor may process sequential instructions in a fetch stage, decode/dispatch stage, issue stage, execution stage, finish stage, and completion stage. Each of these individual stages may employ its own set of pipeline stages to accomplish the desired processing tasks.

Multi-thread instruction processing is an additional technique that may be used in conjunction with pipelining to increase processing speed. Multi-thread instruction processing involves dividing a set of program instructions into two or more distinct groups or threads of instructions. This multi-threading technique allows instructions from one thread to be processed through a pipeline while another thread may be unable to be processed for some reason. This avoids the situation encountered in single-threaded instruction processing in which all instructions are held up while a particular instruction cannot be executed, such as, for example, in a cache miss situation where data required to execute a particular instruction is not immediately available. Data processors capable of processing multiple instruction threads are often referred to as simultaneous multithreading (SMT) processors.

It should be noted at this point that there is a distinction between the way the software community uses the term "multithreading" and the way the term "multithreading" is used in the computer architecture community. The software community uses the term "multithreading" to refer to a single task subdivided into multiple, related threads. In computer architecture, the term "multithreading" refers to threads that may be independent of each other. The term "multithreading" is used in this document in the same sense employed by the computer architecture community.

To facilitate multithreading, the instructions from the different threads are interleaved in some fashion at some point in the overall processor pipeline. There are generally two different techniques for interleaving instructions for processing in a SMT processor. One technique involves interleaving the threads based on some long latency event, such as a cache miss that produces a delay in processing one thread. In this technique all of the processor resources are devoted to a single thread until processing of that thread is delayed by some long latency event. Upon the occurrence of the long latency event, the processor quickly switches to another thread and advances that thread until some long latency event occurs for that thread or until the circumstance that stalled the other thread is resolved.

The other general technique for interleaving instructions from multiple instruction threads in a SMT processor involves interleaving instructions on a cycle-by-cycle basis according to some interleaving rule (also sometimes referred to herein as an interleave rule). A simple cycle-by-cycle interleaving technique may simply interleave instructions from the different threads on a one-to-one basis. For example, a two-thread SMT processor may take an instruction from a first thread in a first clock cycle, an instruction from a second thread in a second clock cycle, another instruction from the first thread in a third clock cycle and so forth, back and forth between the two instruction threads. A more complex cycle-by-cycle interleaving technique may involve using software instructions to assign a priority to each instruction thread and then interleaving instructions from the different threads to enforce some rule based upon the relative thread priorities. For example, if one thread in a two-thread SMT processor is assigned a higher priority than the other thread, a simple interleaving rule may require that twice as many instructions from the higher priority thread be included in the interleaved stream as compared to instructions from the lower priority thread.

A more complex cycle-by-cycle interleaving rule in current use assigns each thread a priority from "1" to "7" and places an instruction from the lower priority thread into the interleaved stream of instructions based on the function $1/(2|X-Y|+1)$, where X=the software assigned priority of a first thread, and Y=the software assigned priority of a second thread. In the case where two threads have equal priority, for example, X=3 and Y=3, the function produces a ratio of 1/2, and an instruction from each of the two threads will be included in the interleaved instruction stream once out of every two clock cycles. If the thread priorities differ by 2, for example, X=2 and Y=4, then the function produces a ratio of 1/8, and an instruction from the lower priority thread will be included in the interleaved instruction stream once out of every eight clock cycles.

Using a priority rule to choose how often to include instructions from particular threads is generally intended to ensure that processor resources are allotted based on the software assigned priority of each thread. There are, however, situations in which relying on purely software assigned thread priorities may not result in an optimum allotment of processor resources. In particular, software assigned thread priorities cannot take into account processor events, such as a cache miss, for example, that may affect the ability of a particular thread of instructions to advance through a processor pipeline. Thus, the occurrence of some event in the processor may completely or at least partially defeat the goal of assigning processor resources efficiently between different instruction threads in a multi-thread processor.

For example, a priority of 5 may be assigned by software to a first instruction thread in a two thread system, while a priority of 2 may be assigned by software to a second instruction thread. Using the priority rule $1/(2|X-Y|+1)$ described above, these software assigned priorities would dictate that an instruction from the lower priority thread would be interleaved into the interleaved instruction stream only once every sixteen clock cycles, while instructions from the higher priority instruction thread would be interleaved fifteen out of every sixteen clock cycles. If an instruction from the higher priority instruction thread experiences a cache miss, the priority rule would still dictate that fifteen out of every sixteen instructions comprise instructions from the higher priority instruction thread, even though the occurrence of the cache miss could effectively stall the execution of the respective instruction thread until the data for the instruction becomes available.

In an embodiment, each instruction thread in a SMT processor is associated with a software assigned base input processing priority. Unless some predefined event or circumstance occurs with an instruction being processed or to be processed, the base input processing priorities of the respective threads are used to determine the interleave frequency between the threads according to some instruction interleave rule. However, upon the occurrence of some predefined event or circumstance in the processor related to a particular instruction thread, the base input processing priority of one or more instruction threads is adjusted to produce one more adjusted priority values. The instruction interleave rule is then enforced according to the adjusted priority value or values together with any base input processing priority values that have not been subject to adjustment.

Intel® Hyper-threading is described in "Intel® Hyper-Threading Technology, Technical User's Guide" 2003 from Intel® corporation, incorporated herein by reference. According to the Technical User's Guide, efforts to improve system performance on single processor systems have traditionally focused on making the processor more capable. These approaches to processor design have focused on making it possible for the processor to process more instructions faster through higher clock speeds, instruction-level parallelism (ILP) and caches. Techniques to achieve higher clock speeds include pipelining the micro-architecture to finer granularities, which is also called super-pipelining. Higher clock frequencies can greatly improve performance by increasing the number of instructions that can be executed each second. But because there are far more instructions being executed in a super-pipelined micro-architecture, handling of events that disrupt the pipeline, such as cache misses, interrupts and branch miss-predictions, is much more critical and failures more costly. ILP refers to techniques to increase the number of instructions executed each clock cycle. For example, many super-scalar processor implementations have multiple execution units that can process instructions simultaneously. In these super-scalar implementations, several instructions can be executed each clock cycle. With simple in-order execution, however, it is not enough to simply have multiple execution units. The challenge is to find enough instructions to execute. One technique is out-of-order execution where a large window of instructions is simultaneously evaluated and sent to execution units, based on instruction dependencies rather than program order. Accesses to system memory are slow, though faster than accessing the hard disk, but when compared to execution speeds of the processor, they are slower by orders of magnitude. One technique to reduce the delays introduced by accessing system memory (called latency) is to acid fast caches close to the processor. Caches provide fast memory access to frequently accessed data or instructions. As cache speeds increase, however, so does the problem of heat dissipation and of cost. For this reason, processors often are designed with a cache hierarchy in which fast, small caches are located near and operated at access latencies close to that of the processor core. Progressively larger caches, which handle less frequently accessed data or instructions, are implemented with longer access latencies. Nonetheless, times can occur when the needed data is not in any processor cache. Handling such cache misses requires accessing system memory or the hard disk, and during these times, the processor is likely to stall while waiting for memory transactions to finish. Most techniques for improving processor performance from one generation to the next are complex and often add significant die-size and power costs. None of these techniques operate at 100 percent efficiency thanks to limited parallelism in instruction flows. As a result, doubling the number of execution units in a processor does not double the performance of the processor. Similarly, simply doubling the clock rate does not double the performance due to the number of processor cycles lost to a slower memory subsystem.

Multithreading

As processor capabilities have increased, so have demands on performance, which has increased pressure on processor resources with maximum efficiency. Noticing the time that processors wasted running single tasks while waiting for certain events to complete, software developers began wondering if the processor could be doing some other work at the same time.

To arrive at a solution, software architects began writing operating systems that supported running pieces of programs, called threads. Threads are small tasks that can run independently. Each thread gets its own time slice, so each thread represents one basic unit of processor utilization. Threads are organized into processes, which are composed of one or more threads. All threads in a process share access to the process resources.

These multithreading operating systems made it possible for one thread to run while another was waiting for something to happen. On Intel processor-based personal computers and servers, today's operating systems, such as Microsoft Windows* 2000 and Windows* XP, all support multithreading. In fact, the operating systems themselves are multithreaded. Portions of them can run while other portions are stalled.

To benefit from multithreading, programs need to possess executable sections that can run in parallel. That is, rather than being developed as a long single sequence of instructions, programs are broken into logical operating sections. In this way, if the application performs operations that run independently of each other, those operations can be broken up into threads whose execution is scheduled and controlled by the operating system. These sections can be created to do different things, such as allowing Microsoft Word* to repaginate a document while the user is typing. Repagination occurs on one thread and handling keystrokes occurs on another. On single processor systems, these threads are executed sequentially, not concurrently. The processor switches back and forth between the keystroke thread and the repagination thread quickly enough that both processes appear to occur simultaneously. This is called functionally decomposed multithreading.

Multithreaded programs can also be written to execute the same task on parallel threads. This is called data-decomposed multithreaded, where the threads differ only in the data that is processed. For example, a scene in a graphic application could be drawn so that each thread works on half of the scene. Typically, data-decomposed applications are threaded for throughput performance while functionally decomposed applications are threaded for user responsiveness or functionality concerns.

When multithreaded programs are executing on a single processor machine, some overhead is incurred when switching context between the threads. Because switching between threads costs time, it appears that running the two threads this way is less efficient than running two threads in succession. If either thread has to wait on a system device for the user, however, the ability to have the other thread continue operating compensates very quickly for all the overhead of the switching. Since one thread in the graphic application example handles user input, frequent periods when it is just waiting certainly occur. By switching between threads, operating systems that support multithreaded programs can improve performance and user responsiveness, even if they are running on a single processor system.

In the real world, large programs that use multithreading often run many more than two threads. Software such as database engines creates a new processing thread for every request for a record that is received. In this way, no single I/O operation prevents new requests from executing and bottlenecks can be avoided. On some servers, this approach can mean that thousands of threads are running concurrently on the same machine.

Multiprocessing

Multiprocessing systems have multiple processors running at the same time. Traditional Intel® architecture multiprocessing systems have anywhere from two to about 512 processors. Multiprocessing systems allow different threads to run on different processors. This capability considerably accelerates program performance. Now two threads can run more or less independently of each other without requiring thread switches to get at the resources of the processor. Multiprocessor operating systems are themselves multithreaded, and the threads can use the separate processors to the best advantage.

Originally, there were two kinds of multiprocessing: asymmetrical and symmetrical. On an asymmetrical system, one or more processors were exclusively dedicated to specific tasks, such as running the operating system. The remaining processors were available for all other tasks (generally, the user applications). It quickly became apparent that this configuration was not optimal. On some machines, the operating system processors were running at 100 percent capacity, while the user-assigned processors were doing nothing. In short order, system designers came to favor an architecture that balanced the processing load better: symmetrical multiprocessing (SMP). The "symmetry" refers to the fact that any thread—be it from the operating system or the user application—can run on any processor. In this way, the total computing load is spread evenly across all computing resources. Today, symmetrical multiprocessing systems are the norm and asymmetrical designs have nearly disappeared.

SMP systems use double the number of processors, however performance will not double. Two factors that inhibit performance from simply doubling are:
- How well the workload can be parallelized
- System overhead Two factors govern the efficiency of interactions between threads:
- How they compete for the same resources
- How they communicate with other threads Multiprocessor Systems Today's server applications consist of multiple threads or processes that can be executed in parallel. Online transaction processing and Web services have an abundance of software threads that can be executed simultaneously for faster performance. Even desktop applications are becoming increasingly parallel. Intel architects have implemented thread-level parallelism (TLP) to improve performance relative to transistor count and power consumption.

In both the high-end and mid-range server markets, multiprocessors have been commonly used to get more performance from the system. By adding more processors, applications potentially get substantial performance improvement by executing multiple threads on multiple processors at the same time. These threads might be from the same application, from different applications running simultaneously, from operating-system services, or from operating-system threads doing background maintenance. Multiprocessor systems have been used for many years, and programmers are familiar with the techniques to exploit multiprocessors for higher performance levels.

US Patent Application Publication No. 2011/0087865 "Intermediate Register Mapper" filed Apr. 14, 2011 by Barrick et al., and incorporated herein by reference teaches "A method, processor, and computer program product employing an intermediate register mapper within a register renaming mechanism. A logical register lookup determines whether a hit to a logical register associated with the dispatched instruction has occurred. In this regard, the logical register lookup searches within at least one register mapper from a group of register mappers, including an architected register mapper, a unified main mapper, and an intermediate register mapper. A single hit to the logical register is selected among the group of register mappers. If an instruction having a mapper entry in the unified main mapper has finished but has not completed, the mapping contents of the register mapper entry in the unified main mapper are moved to the intermediate register mapper, and the unified register mapper entry is released, thus increasing a number of unified main mapper entries available for reuse."

US Patent Application Publication No. 2011/0087865 "Intermediate Register Mapper" filed Apr. 14, 2011 by Barrick et al., and incorporated herein by reference teaches "A method, processor, and computer program product employing an intermediate register mapper within a register renaming mechanism. A logical register lookup determines whether a hit to a logical register associated with the dispatched instruction has occurred. In this regard, the logical register lookup searches within at least one register mapper from a group of register mappers, including an architected register mapper, a unified main mapper, and an intermediate register mapper. A single hit to the logical register is selected among the group of register mappers. If an instruction having a mapper entry in the unified main mapper has finished but has not completed, the mapping contents of the register mapper entry in the unified main mapper are moved to the intermediate register mapper, and the unified register mapper entry is released, thus increasing a number of unified main mapper entries available for reuse."

U.S. Pat. No. 6,314,511 filed Apr. 2, 1998 "Mechanism for freeing registers on processors that perform dynamic out-of-order execution of instructions using renaming registers" by Levy et al., incorporated by reference herein teaches "freeing renaming registers that have been allocated to architectural registers prior to another instruction redefining the architectural register. Renaming registers are used by a processor to dynamically execute instructions out-of-order in either a single or multi-threaded processor that executes instructions out-of-order. A mechanism is described for freeing renaming registers that consists of a set of instructions, used by a compiler, to indicate to the processor when it can free the physical (renaming) register that is allocated to a particular architectural register. This mechanism permits the renaming register to be reassigned or reallocated to store another value as soon as the renaming register is no longer needed for allocation to the architectural register. There are at least three ways to enable the processor with an instruction that identifies the renaming register to be freed from allocation: (1) a user may explicitly provide the instruction to the processor that refers to a particular renaming register; (2) an operating system may provide the instruction when a thread is idle that refers to a set of registers associated with the thread; and (3) a compiler may include the instruction with the plurality of instructions presented to the processor. There are at least five embodiments of the instruction provided to the processor for freeing renaming registers allocated to architectural registers: (1) Free Register Bit; (2) Free Register; (3) Free Mask; (4) Free Opcode; and (5) Free Opcode/Mask. The Free Register Bit instruction provides the largest speedup for an out-of-order processor and the Free Register instruction provides the smallest speedup."

"Power ISA™ Version 2.06 Revision B" published Jul. 23, 2010 from IBM® and incorporated by reference herein teaches an example RISC (reduced instruction set computer) instruction set architecture. The Power ISA will be used herein in order to demonstrate example embodiments, however, the invention is not limited to Power ISA or RISC architectures. Those skilled in the art will readily appreciate use of the invention in a variety of architectures.

"z/Architecture Principles of Operation" SA22-7832-08, Ninth Edition (August, 2010) from IBM® and incorporated by reference herein teaches an example CISC (complex instruction set computer) instruction set architecture.

SUMMARY

Operand liveness may be controlled by program execution, execution of machine instructions indicating change of operand liveness, and operating system control. In an embodiment certain machine instructions indicate a last-use of a register operand of an architected register. The last-use register is subsequently not accessible by machine instructions and can need not be backed by any physical register. An enable instruction may later re-establish the architected register causing a physical register to be assigned to the architected register. one or more of the architected registers may be disabled at any one time. In one embodiment, the operating system enables only a subset of architected registers for a given application program. The application program, may enable and disable architected registers of the subset, but can not enable any architected register not in the subset.

In an embodiment, liveness information is maintained for executing programs, the method comprising maintaining, by a processor, current operand state information, the current operand state information for indicating whether corresponding current operands are any one of enabled or disabled for use by a first program module, the first program module comprising machine instructions of an instruction set architecture (ISA), the first program module currently being executed by the processor. A current operand is accessed, by a machine instruction of said first program module, the accessing comprising using the current operand state information to determine whether a previously stored current operand value is accessible by the first program module.

In an embodiment, responsive to the current operand being disabled, the accessing comprising at least one of a) and b) comprising returning an architecture-specified value, and where the architecture-specified value is any one of an undefined value, a zero value, a value consisting of all '1's, or a program specified default value; and performing a notification, wherein the notification step is any one of raising an exception, suppressing an exception, raising and suppressing an exception under control of machine state, providing debug information, and setting at least one register to indicate occurrence of an access to a disabled operand.

In an embodiment, program execution is transferred from the first program module to a second program module, and a) through b) is performed comprising saving the current operand state information of the first program module in a context switch save area, loading, from the context switch save area, new operand state information as current operand state information of a second program to be executed; and initiating execution of the second program using the loaded current operand state information.

In an embodiment, the transferring execution is a context switch operation, wherein the current operands consist of any one of architected general register values of general registers identified by instructions or architected floating point register values of floating point registers identified by instructions, wherein the transferring execution further comprises saving a program counter value and current operand values of enabled current operands of the first program module in the context switch save area; and loading, from the context switch save area, new operand values of new enabled operands as current operand values of current operands of the second program to be executed, wherein the initiated execution of the second program uses the loaded current operands.

In an embodiment the current operand state information further comprises an operand enablement control for controlling whether current operand state information can be changed between enabled and disabled by a current program.

In an embodiment, when a first operand disable instruction is executed, the execution causing current operand state information of a first operand to disable the first operand, wherein reads of disabled operands return an architecture dependent default value; and second operand enable instruction is executed, the execution causing current operand state information of a second operand enable the second operand, wherein reads of enabled operands return values previously stored to said enabled operands.

In an embodiment, the default value consists of any one of an architecture undefined value, a value previously stored in an architecture defined default value register, all 1's all 0's, an incremented value or a decremented value, wherein the incremented value is incremented with each read access, wherein the decremented value is decremented with each read access.

In an embodiment, the first operand disable instruction is a prefix instruction, the execution of the prefix instruction indicating to the processor, that the first operand is to be disabled after use by a next sequential instruction following the prefix instruction in program order.

In an embodiment, write operations to disabled operands cause the disabled operand to be enabled, wherein the second operand enable instruction is a write instruction for writing to the second operand.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 9 depicts an example Move from Special-Purpose Register (MFSPR).

FIG. 10 depicts an example Store Doublewod.

FIG. 11 depicts an example Move from Special-Purpose Register (MFSPR).

FIG. 12 depicts an example Move to Special Purpose Register (MTSPR).

DETAILED DESCRIPTION

Figure 1:
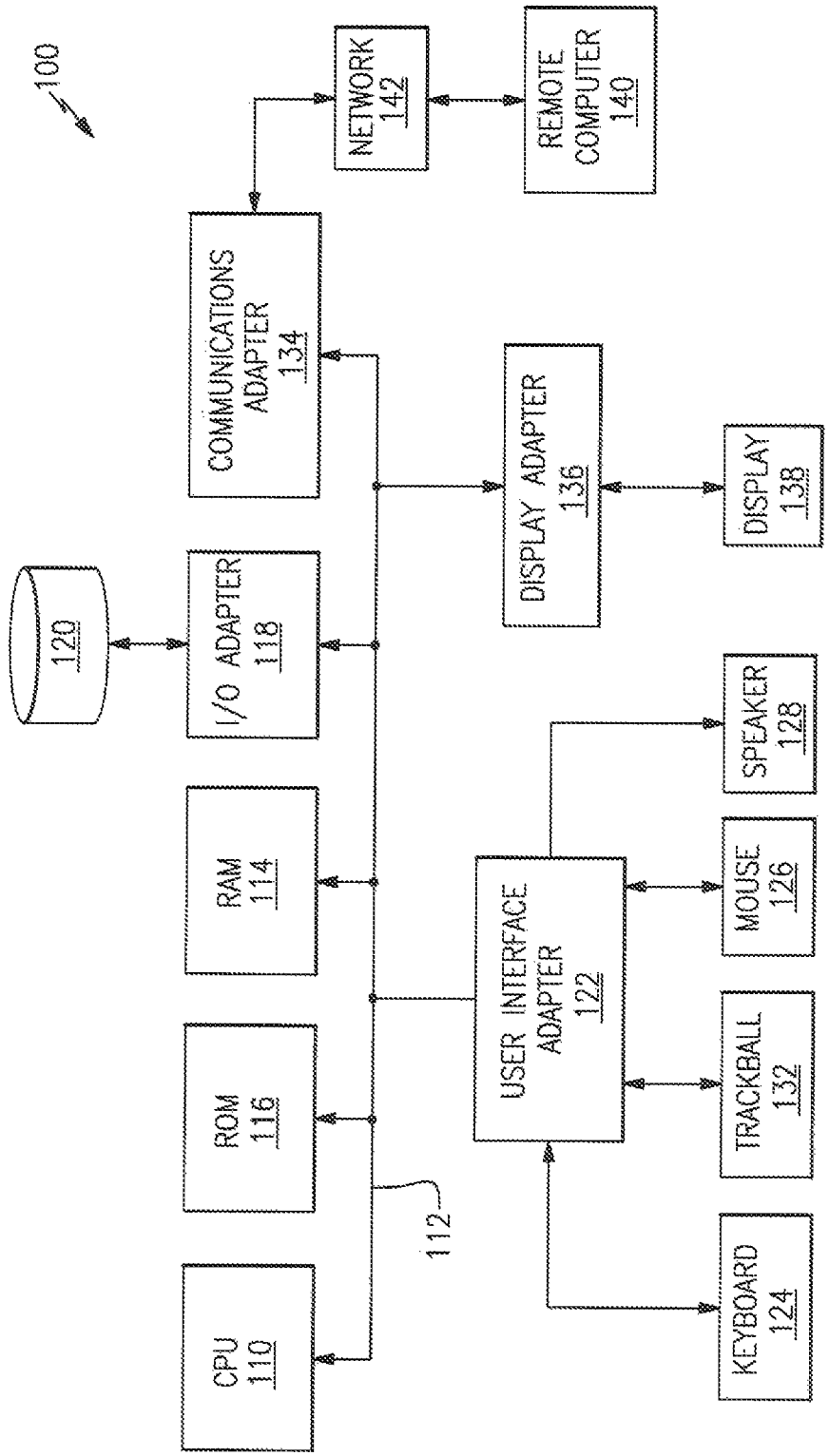
FIG. 1 depicts an example processor system configuration.

An Out of Order (OoO) processor typically contains multiple execution pipelines that may opportunistically execute instructions in a different order than what the program sequence (or "program order") specifies in order to maximize the average instruction per cycle rate by reducing data dependencies and maximizing utilization of the execution pipelines allocated for various instruction types. Results of instruction execution are typically held temporarily in the physical registers of one or more register files of limited depth. An OoO processor typically employs register renaming to avoid unnecessary serialization of instructions due to the reuse of a given architected register by subsequent instructions in the program order.

According to Barrick, under register renaming operations, each architected (i.e., logical) register targeted by an instruction is mapped to a unique physical register in a register file. In current high-performance OoO processors, a unified main mapper is utilized to manage the physical registers within multiple register files. In addition to storing the logical-to-physical register translation (i.e., in mapper entries), the unified main mapper is also responsible for storing dependency data (i.e., queue position data), which is important for instruction ordering upon completion.

In a unified main mapper-based renaming scheme, it is desirable to free mapper entries as soon as possible for reuse by the OoO processor. However, in the prior art, a unified main mapper entry cannot be freed until the instruction that writes to a register mapped by the mapper entry is completed. This constraint is enforced because, until completion, there is a possibility that an instruction that has "finished" (i.e., the particular execution unit (EU) has successfully executed the instruction) will still be flushed before the instruction can "complete" and before the architected, coherent state of the registers is updated.

In current implementations, resource constraints at the unified main mapper have generally been addressed by increasing the number of unified main mapper entries. However, increasing the size of the unified main mapper has a concomitant penalty in terms of die area, complexity, power consumption, and access time.

In Barrick, there is provided a method for administering a set of one or more physical registers in a data processing system. The data processing system has a processor that processes instructions out-of-order, wherein the instructions reference logical registers and wherein each of the logical registers is mapped to the set of one or more physical registers. In response to dispatch of one or more of the instructions, a register management unit performs a logical register lookup, which determines whether a hit to a logical register associated with the dispatched instruction has occurred within one or more register mappers. In this regard, the logical register lookup searches within at least one register mapper from a group of register mappers, including an architected register mapper, a unified main mapper, and an intermediate register mapper. The register management unit selects a single hit to the logical register among the group of register mappers. If an instruction having a mapper entry in the unified main mapper has finished but has not completed, the register management unit moves logical-to-physical register renaming data of the unified main mapping entry in the unified main mapper to the intermediate register mapper, and the unified main mapper releases the unified main mapping entry prior to completion of the instruction. The release of the unified main mapping entry increases a number of unified main mapping entries available for reuse.

With reference now to the figures, and in particular to FIG. 1, an example is shown of a data processing system 100 which may include an OoO processor employing an intermediate register mapper as described below with reference to FIG. 2. As shown in FIG. 1, data processing system 100 has a central processing unit (CPU) 110, which may be implemented with processor 200 of FIG. 2. CPU 110 is coupled to various other components by an interconnect 112. Read only memory ("ROM") 116 is coupled to the interconnect 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a storage device 120. Communications adapter 134 interfaces interconnect 112 with network 140, which enables data processing system 100 to communicate with other such systems, such as remote computer 142. Input/Output devices are also connected to interconnect 112 via user interface adapter 122 and display adapter 136. Keyboard 124, track ball 132, mouse 126 and speaker 128 are all interconnected to bus 112 via user interface adapter 122. Display 138 is connected to system bus 112 by display adapter 136. In this manner, data processing system 100 receives input, for example, throughout keyboard 124, trackball 132, and/or mouse 126 and provides output, for example, via network 142, on storage device 120, speaker 128 and/or display 138. The hardware elements depicted in data processing system 100 are not intended to be exhaustive, but rather represent principal components of a data processing system in one embodiment.

Operation of data processing system 100 can be controlled by program code, such as firmware and/or software, which typically includes, for example, an operating system such as AIX® ("AIX" is a trademark of the IBM Corporation) and one or more application or middleware programs.

Figure 2:
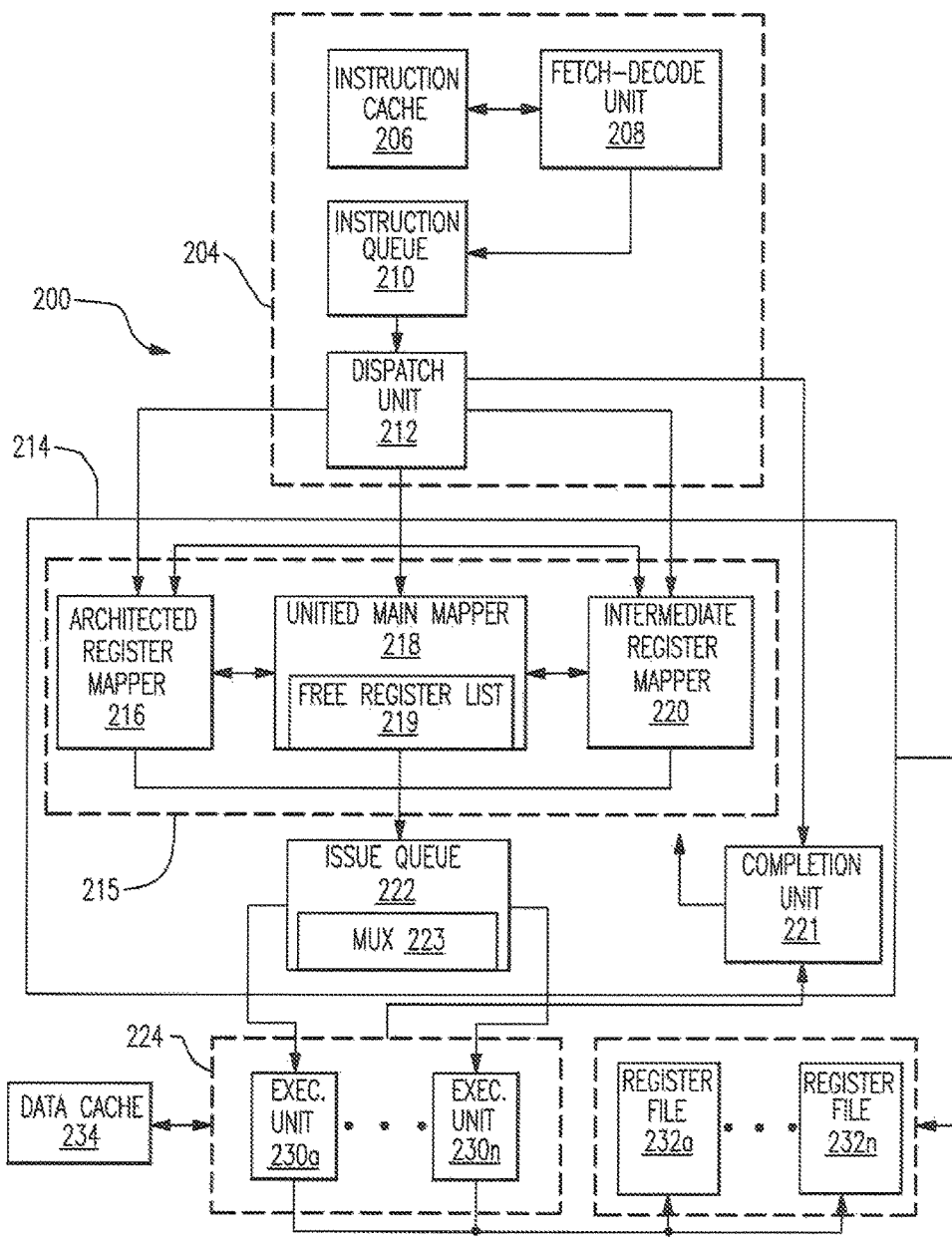
FIG. 2 depicts a first example processor pipeline.

Referring now to FIG. 2, there is depicted a superscalar processor 200. Instructions are retrieved from memory (e.g., RAM 114 of FIG. 1) and loaded into instruction sequencing logic (ISL) 204, which includes Level 1 Instruction cache (L1 I-cache) 206, fetch-decode unit 208, instruction queue 210 and dispatch unit 212. Specifically, the instructions are loaded in L1 I-cache 206 of ISL 204. The instructions are retained in L1 I-cache 206 until they are required, or replaced if they are not needed. Instructions are retrieved from L1 I-cache 206 and decoded by fetch-decode unit 208. After decoding a current instruction, the current instruction is loaded into instruction queue 210. Dispatch unit 212 dispatches instructions from instruction queue 210 into register management unit 214, as well as completion unit 240. Completion unit 240 is coupled to general execution unit 224 and register management unit 214, and monitors when an issued instruction has completed.

When dispatch unit 212 dispatches a current instruction, unified main mapper 218 of register management unit 214 allocates and maps a destination logical register number to a physical register within physical register files 232a-232n that is not currently assigned to a logical register. The destination is said to be renamed to the designated physical register among physical register files 232a-232n. Unified main mapper 218 removes the assigned physical register from a list 219 of free physical registers stored within unified main mapper 218. All subsequent references to that destination logical register will point to the same physical register until fetch-decode unit 208 decodes another instruction that writes to the same logical register. Then, unified main mapper 218 renames the logical register to a different physical location selected from free list 219, and the mapper is updated to enter the new logical-to-physical register mapper data. When the logical-to-physical register mapper data is no longer needed, the physical registers of old mappings are returned to free list 219. If free physical register list 219 does not have enough physical registers, dispatch unit 212 suspends instruction dispatch until the needed physical registers become available.

After the register management unit 214 has mapped the current instruction, issue queue 222 issues the current instruction to general execution engine 224, which includes execution units (EUs) 230a-230n. Execution units 230a-230n are of various types, such as floating-point (FP), fixed-point (FX), and load/store (LS). General execution engine 224 exchanges data with data memory (e.g. RAM 114, ROM 116 of FIG. 1) via a data cache 234. Moreover, issue queue 222 may contain instructions of FP type, FX type, and LS instructions. However, it should be appreciated that any number and types of instructions can be used. During execution, EUs 230a-230n obtain the source operand values from physical locations in register file 232a-232n and store result data, if any, in register files 232a-232n and/or data cache 234.

Still referring to FIG. 2, register management unit 214 includes: (i) mapper cluster 215, which includes architected register mapper 216, unified main mapper 218, intermediate register mapper 220, and (ii) issue queue 222. Mapper cluster 215 tracks the physical registers assigned to the logical registers of various instructions. In an exemplary embodiment, architected register mapper 216 has 16 logical (i.e., not physically mapped) registers of each type that store the last, valid (i.e., checkpointed) state of logical-to-physical register mapper data. However, it should be recognized that different processor architectures can have more or less logical registers, as described in the exemplary embodiment. Architected register mapper 216 includes a pointer list that identifies a physical register which describes the checkpointed state. Physical register files 232a-232n will typically contain more registers than the number of entries in architected register mapper 216. It should be noted that the particular number of physical and logical registers that are used in a renaming mapping scheme can vary.

In contrast, unified main mapper 218 is typically larger (typically contains up to 20 entries) than architected register mapper 216. Unified main mapper 218 facilitates tracking of the transient state of logical-to-physical register mappings. The term "transient" refers to the fact that unified main mapper 218 keeps track of tentative logical-to-physical register mapping data as the instructions are executed out-of-order. OoO execution typically occurs when there are older instructions which would take longer (i.e., make use of more clock cycles) to execute than newer instructions in the pipeline. However, should an OoO instruction's executed result require that it be flushed for a particular reason (e.g., a branch miss-prediction), the processor can revert to the check pointed state maintained by architected register mapper 216 and resume execution from the last, valid state.

Unified main mapper 218 makes the association between physical registers in physical register files 232a-232n and architected register mapper 216. The qualifying term "unified" refers to the fact that unified main mapper 218 obviates the complexity of custom-designing a dedicated mapper for each of register files 232 (e.g., general-purpose registers (GPRs), floating-point registers (FPRs), fixed-point registers (FXPs), exception registers (XERs), condition registers (CRs), etc.).

In addition to creating a transient, logical-to-physical register mapper entry of an OoO instruction, unified main mapper 218 also keeps track of dependency data (i.e., instructions that are dependent upon the finishing of an older instruction in the pipeline), which is important for instruction ordering. Conventionally, once unified main mapper 218 has entered an instruction's logical-to-physical register translation, the instruction passes to issue queue 222. Issue queue 222 serves as the gatekeeper before the instruction is issued to execution unit 230 for execution. As a general rule, an instruction cannot leave issue queue 222 if it depends upon an older instruction to finish. For this reason, unified main mapper 218 tracks dependency data by storing the issue queue position data for each instruction that is mapped. Once the instruction has been executed by general execution engine 224, the instruction is said to have "finished" and is retired from issue queue 222.

Register management unit 214 may receive multiple instructions from dispatch unit 212 in a single cycle so as to maintain a filled, single issue pipeline. The dispatching of instructions is limited by the number of available entries in unified main mapper 218. In conventional mapper systems, which lack intermediate register mapper 220, if unified main mapper 218 has a total of 20 mapper entries, there is a maximum of 20 instructions that can be in flight (i.e., not checkpointed) at once. Thus, dispatch unit 212 of a conventional mapper system can conceivably "dispatch" more instructions than what can actually be retired from unified main mapper 218. The reason for this bottleneck at the unified main mapper 218 is due to the fact that, conventionally, an instruction's mapper entry could not retire from unified main mapper 218 until the instruction "completed" (i.e., all older instructions have "finished" executing).

According to one embodiment, intermediate register mapper 220 serves as a non-timing-critical register for which a "finished", but "incomplete" instruction from unified main mapper 218 could retire to (i.e., removed from unified main mapper 218) in advance of the instruction's eventual completion. Once the instruction "completes", completion unit 240 notifies intermediate register mapper 220 of the completion. The mapper entry in intermediate register mapper 220 can then update the architected coherent state of architected register mapper 216 by replacing the corresponding entry that was presently stored in architected register mapper 216.

When dispatch unit 212 dispatches an instruction, register management unit 214 evaluates the logical register number(s) associated with the instruction against mappings in architected register mapper 216, unified main mapper 218, and intermediate register mapper 220 to determine whether a match (commonly referred to as a "hit") is present in architected register mapper 216, unified main mapper 218, and/or intermediate register mapper 220. This evaluation is referred to as a logical register lookup. When the lookup is performed simultaneously at more than one register mapper (i.e., architected register mapper 216, unified main mapper 218, and/or intermediate register mapper 220), the lookup is referred to as a parallel logical register lookup.

Each instruction that updates the value of a certain target logical register is allocated a new physical register. Whenever this new instance of the logical register is used as a source by any other instruction, the same physical register must be used. As there may exist a multitude of instances of one logical register, there may also exist a multitude of physical registers corresponding to the logical register. Register management unit 214 performs the tasks of (i) analyzing which physical register corresponds to a logical register used by a certain instruction, (ii) replacing the reference to the logical register with a reference to the appropriate physical register (i.e., register renaming), and (iii) allocating a new physical register whenever a new instance of any logical register is created (i.e., physical register allocation).

Initially, before any instructions are dispatched, the unified main mapper 218 will not receive a hit/match since there are no instructions currently in flight. In such an event, unified main mapper 218 creates a mapping entry. As subsequent instructions are dispatched, if a logical register match for the same logical register number is found in both architected register mapper 216 and unified main mapper 218, priority is given to selecting the logical-to-physical register mapping of unified main mapper 218 since the possibility exists that there may be instructions currently executing OoO (i.e., the mapping is in a transient state).

After unified main mapper 218 finds a hit/match within its mapper, the instruction passes to issue queue 222 to await issuance for execution by one of execution units 230. After general execution engine 224 executes and "finishes" the instruction, but before the instruction "completes", register management unit 214 retires the mapping entry presently found in unified main mapper 218 from unified main mapper 218 and moves the mapping entry to intermediate register mapper 220. As a result, a slot in unified main mapper 218 is made available for mapping a subsequently dispatched instruction. Unlike unified main mapper 218, intermediate register mapper 220 does not store dependency data. Thus, the mapping that is transferred to intermediate register mapper 220 does not depend (and does not track) the queue positions of the instructions associated with its source mappings. This is because issue queue 222 retires the "finished, but not completed" instruction is after a successful execution. In contrast, under conventional rename mapping schemes lacking an intermediate register mapper, a unified main mapper continues to store the source rename entry until the instruction completes. Under the present embodiment, intermediate register mapper 220 can be positioned further away from other critical path elements because, unified main mapper 218, its operation is not timing critical.

Once unified main mapper 218 retires a mapping entry from unified main mapper 218 and moves to intermediate register mapper 220, mapper cluster 214 performs a parallel logical register lookup on a subsequently dispatched instruction to determine if the subsequent instruction contains a hit/match in any of architected register mapper 216, unified main mapper 218, and intermediate register mapper 220. If a hit/match to the same destination logical register number is found in at least two of architected register mapper 216, unified main mapper 218, and intermediate register mapper 220, multiplexer 223 in issue queue 222 awards priority by selecting the logical-to-physical register mapping of unified main mapper 218 over that of the intermediate register mapper 220, which in turn, has selection priority over architected register mapper 216.

The mechanism suggested by Barrick by which the selection priority is determined is discussed as follows. A high level logical flowchart of an exemplary method of determining which mapping data values to use in executing an instruction, in accordance with one embodiment. In an embodiment, a dispatch unit 212 dispatching one or more instructions to register management unit 214. In response to the dispatching of the instruction(s), register management unit 214 determines via a parallel logical register lookup whether a "hit" to a logical register (in addition to a "hit" to architected register mapper 216) associated with each dispatched instruction has occurred. In this regard, it should be understood that architected register mapper 216 is assumed to always have hit/match, since architected register mapper 216 stores the checkpointed state of the logical-to-physical register mapper data. If register management unit 214 does not detect a match/hit in unified main mapper 218 and/or intermediate register mapper 220, multiplexer 223 selects the logical-to-physical register renaming data from architected register mapper 216. If register management unit 214 detects a match/hit in unified main mapper 218 and/or intermediate register mapper 220, register management unit 214 determines in a decision block whether a match/hit occurs in both unified main mapper 218 and intermediate register mapper 220. If a hit/match is determined in both mappers 218 and 220, a register management unit 214 determines whether the mapping entry in unified main mapper 218 is "younger" (i.e., the creation of the mapping entry is more recent) than the mapping entry in intermediate register mapper 220. If entry in unified main mapper 218 is younger than the entry in intermediate register mapper 220, multiplexer 223 selects the logical-to-physical register renaming data from unified main mapper 218. If the entry in unified main mapper 218 is not younger than the entry in intermediate register mapper 220, multiplexer 223 selects the logical-to-physical register renaming data from intermediate register mapper 220.

If a match/hit does not occur in both unified main mapper 218 and intermediate register mapper 220, it is determined whether an exclusive hit/match to unified main mapper 218 occurs. If an exclusive hit to unified main mapper 218 occurs, multiplexer 223 selects the logical-to-physical register renaming data from unified main mapper 218. However, if a hit/match does not occur at unified main mapper 218 (thus, the hit/match exclusively occurs at intermediate register mapper 220), multiplexer 223 selects the logical-to-physical register renaming data from intermediate register mapper 220 (block 320). A general execution engine 224 uses the output data of the logical register lookup for execution.

In an example embodiment a dispatch unit 212 dispatches one or more instructions to register management unit 214. A unified main mapper creates a new, logical-to-physical register mapping entry. Issue queue 222 maintains the issue queue position data of the dispatched instruction, which utilizes the mapping entry that is selected via the logical register lookup (described in FIG. 3). General execution engine 224 detects whether any of the instructions under execution has finished (i.e., one of Us 130 has finished execution of an instruction). If the issued instruction has not finished, the method waits for an instruction to finish. In response to general execution engine 224 detecting that an instruction is finished, unified main mapper 218 moves the logical-to-physical register renaming data from unified main mapper 218 to intermediate register mapper 220. Unified main mapper 218 retires the unified main mapping entry associated with the finished instruction. A completion unit 240 determines whether the finished instruction has completed. If the finished instruction has not completed, completion unit 240 continues to wait until it detects that general execution unit 224 has finished all older instructions. However, if completion unit 240 detects that the finished instruction has completed, intermediate register mapper 220 updates the architected coherent state of architected register mapper 216 and the intermediate register mapper 220 retires its mapping entry.

U.S. Pat. No. 6,189,088 "Forwarding stored data fetched for out-of-order load/read operation to over-taken operation read-accessing same memory location" to Gschwind, filed Feb. 13, 2001 and incorporated herein by reference describes an example out-of-order (OoO) processor.

Figure 3:
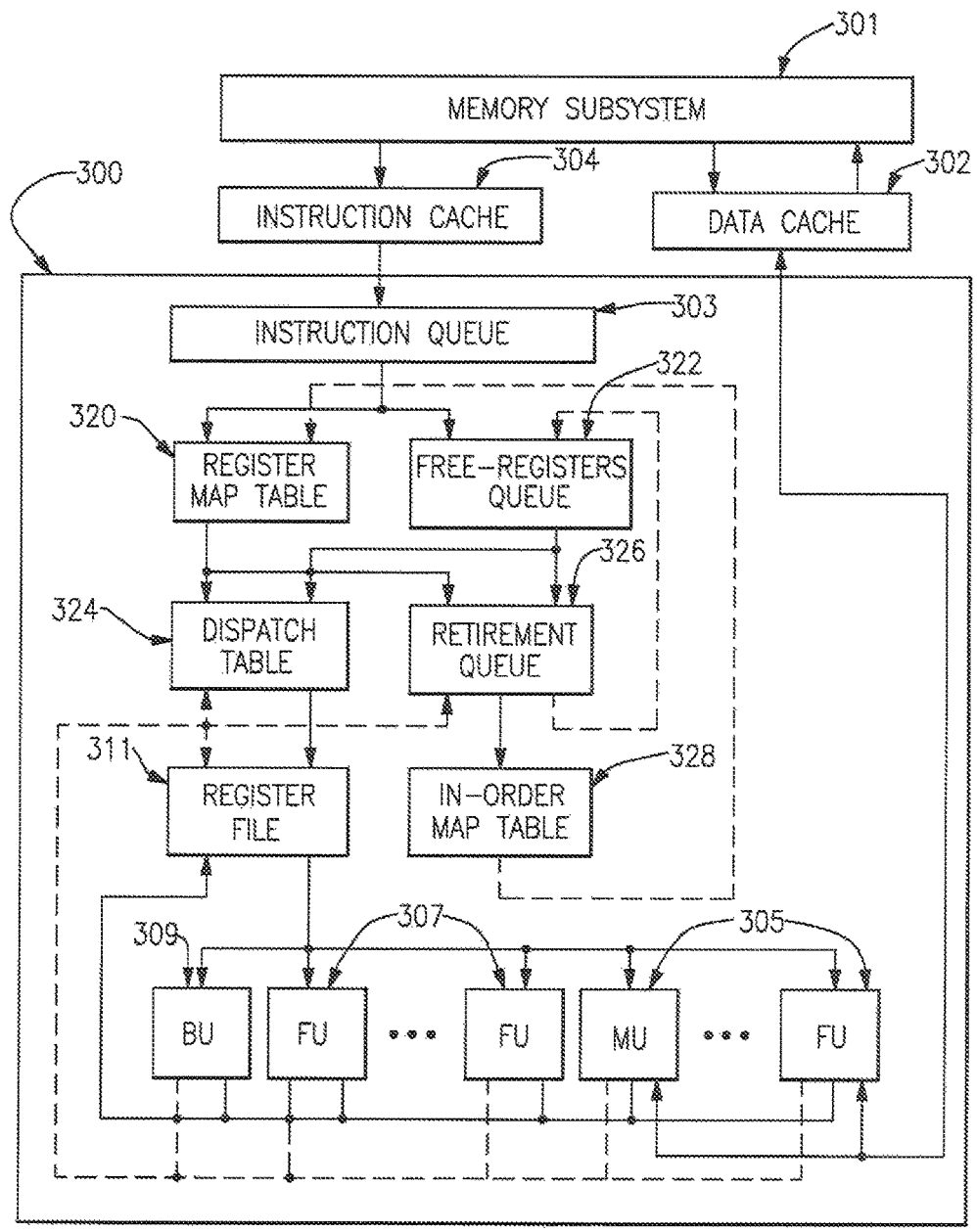
FIG. 3 depicts a second example processor pipeline.

According to Gschwind, FIG. 3 is a functional block diagram of a conventional computer processing system (e.g., including a superscalar processor) that supports dynamic reordering of memory operations and hardware-based implementations of the interference test and data bypass Sequence. That is, the system of FIG. 3 includes the hardware resources necessary to support reordering of instructions using the mechanisms listed above, but does not include the hardware resources necessary to support the execution of out-of-order load operations before in-order load operations. The system consists of: a memory subsystem 301; a data cache 302; an instruction cache 304; and a processor unit 300. The processor unit 500 includes: an instruction queue 303; several memory units (MUs) 305 for performing load and store operations; several functional units (FUs) 307 for performing integer, logic and floating-point operations; a branch unit (BU) 309; a register file 311; a register map table 320; a free-registers queue 322; a dispatch table 324; a retirement queue 326; and an in-order map table 328.

In the processor depicted in FIG. 3, instructions are fetched from instruction cache 304 (or from memory subsystem 301, when the instructions are not in instruction cache 304) under the control of branch unit 309, placed in instruction queue 303, and subsequently dispatched from instruction queue 303. The register names used by the instructions for specifying operands are renamed according to the contents of register map table 320, which specifies the current mapping from architected register names to physical registers. The architected register names used by the instructions for specifying the destinations for the results are assigned physical registers extracted from free-registers queue 322, which contains the names of physical registers not currently being used by the processor. The register map table 320 is updated with the assignments of physical registers to the architected destination register names specified by the instructions. Instructions with all their registers renamed are placed in dispatch table 324. Instructions are also placed in retirement queue 326, in program order, including their addresses, and their physical and architected register names. Instructions are dispatched from dispatch table 324 when all the resources to be used by such instructions are available (physical registers have been assigned the expected operands, and functional units are free). The operands used by the instruction are read from register file 311, which typically includes general-purpose registers (GPRs), floating-point registers (FPRs), and condition registers (CRs). Instructions are executed, potentially out-of-order, in a corresponding memory unit 305, functional unit 307 or branch unit 309. Upon completion of execution, the results from the instructions are placed in register file 311. Instructions in dispatch table 324 waiting for the physical registers set by the instructions completing execution are notified. The retirement queue 326 is notified of the instructions completing execution, including whether they raised any exceptions. Completed instructions are removed from retirement queue 326, in program order (from the head of the queue). At retirement time, if no exceptions were raised by an instruction, then in-order map table 328 is updated so that architected register names point to the physical registers in register file 311 containing the results from the instruction being retired; the previous register names from in-order map table 328 are returned to free-registers queue 322.

On the other hand, if an instruction has raised an exception, then program control is set to the address of the instruction being retired from retirement queue 326. Moreover, retirement queue 326 is cleared (flushed), thus canceling all unretired instructions. Further, the register map table 320 is set to the contents of in-order map table 328, and any register not in in-order map table 328 is added to free-registers queue 322.

A conventional superscalar processor that supports reordering of load instructions with respect to preceding load instructions (as shown in FIG. 3) may be augmented with the following:

1. A mechanism for marking load instructions which are issued out-of-order with respect to preceding load instructions;
2. A mechanism to number instructions as they are fetched, and determine whether an instruction occurred earlier or later in the instruction stream. An alternative mechanism may be substituted to determine whether an instruction occurred earlier or later with respect to another instruction;
3. A mechanism to store information about load operations which have been executed out-of-order, including their address in the program order, the address of their access, and the datum value read for the largest guaranteed atomic unit containing the loaded datum;
4. A mechanism for performing an interference test when a load instruction is executed in-order with respect to one or more out-of-order load instructions, and for performing priority encoding when multiple instructions interfere with a load operation;
5. A mechanism for bypassing the datum associated with an interfering load operation; and
6. A mechanism for deleting the record generated in step (3) at the point where the out-of-order state is retired from retirement queue 326 to register file 311 in program order.

The mechanisms disclosed by Gschwind are used in conjunction with the mechanisms available in the conventional out-of-order processor depicted in FIG. 3, as follows. Each instruction is numbered with an instruction number as it enters instruction queue 303. A load instruction may be dispatched from dispatch table 324 earlier than a preceding load instruction. Such a load instruction is denoted below as an 'out-of-order' load operation. In such a case, the entry in retirement queue 326 corresponding to the load instruction is marked as an out-of-order load.

The detection of the dispatching of an out-of-order load operation from dispatch table 324 to a memory unit 305 for execution is preferably accomplished with two counters, a "loads-fetched counter" and a "loads-dispatched counter". The loads-fetched counter is incremented when a load operation is added to dispatch table 324. The loads-dispatched counter is incremented when a load operation is sent to a memory unit 305 for execution. The current contents of the loads-fetched counter is attached to a load instruction when the load instruction is added to dispatch table 324. When the load instruction is dispatched from dispatch table 324 to a memory unit 305 for execution, if the value attached to the load instruction in dispatch table 324 is different from the contents of the loads-dispatched counter at that time, then the load instruction is identified as an out-of-order load operation. Note that the difference among the two counter values corresponds to the exact number of load operations with respect to which load instruction is being issued out-of-order. Out-of-order load instructions are only dispatched to a memory unit 305 if space for adding entries in load-order table is available.

The load-order table is a single table which is accessed by all memory units 305 simultaneously (i.e., only a single logical copy is maintained, although multiple physical copies may be maintained to speed up processing). Note that if multiple physical copies are used, then the logical contents of the multiple copies must always reflect the same state to all memory units 305.

The instruction number of the instruction being executed and the fact of whether an instruction is executed speculatively is communicated to memory unit 305 for each load operation issued.

An instruction set architecture (ISA), implemented by a processor, typically defines a fixed number of architected general purpose registers that are accessible, based on register fields of instructions of the ISA. In out-of-order execution processors, rename registers are assigned to hold register results of speculatively executed of instructions. The value of the rename register is committed as an architected register value, when the corresponding speculative instruction execution is "committed" or "completed. Thus, at any one point in time, and as observed by a program executing on the processor, in a register rename embodiment, there exist many more rename registers than architected registers.

In one embodiment of rename registers, separate registers are assigned to architected registers and rename registers. In another, embodiment, rename registers and architected registers are merged registers. The merged registers include a tag for indicating the state of the merged register, wherein in one state, the merged register is a rename register and in another state, the merged register is an architected register.

In a merged register embodiment, as part of the initialization (for example, during a context switch, or when initializing a partition), the first n physical registers are assigned as the architectural registers, where n is the number of the registers declared by the instruction set architecture (ISA). These registers are set to be in the architectural register (AR) state; the remaining physical registers take on the available state. When an issued instruction includes a destination register, a new rename buffer is needed. For this reason, one physical register is selected from the pool of the available registers and allocated to the destination register. Accordingly, the selected register state is set to the rename buffer not-valid state (NV), and its valid bit is reset. After the associated instruction finishes execution, the produced result is written into the selected register, its valid bit is set, and its state changes to rename buffer (RB), valid. Later, when the associated instruction completes, the allocated rename buffer will be declared to be the architectural register that implements the destination register specified in the just completed instruction. Its state then changes to the architectural register state (AR) to reflect this.

While registers are almost a universal solution to performance, they do have a drawback. Different parts of a computer program all use their own temporary values, and therefore compete for the use of the registers. Since a good understanding of the nature of program flow at runtime is very difficult, there is no easy way for the developer to know in advance how many registers they should use, and how many to leave aside for other parts of the program. In general these sorts of considerations are ignored, and the developers, and more likely, the compilers they use, attempt to use all the registers visible to them. In the case of processors with very few registers to begin with, this is also the only reasonable course of action.

Register windows aim to solve this issue. Since every part of a program wants registers for its own use, several sets of registers are provided for the different parts of the program. If these registers were visible, there would be more registers to compete over, i.e. they have to be made invisible.

Rendering the registers invisible can be implemented efficiently; the CPU recognizes the movement from one part of the program to another during a procedure call. It is accomplished by one of a small number of instructions (prologue) and ends with one of a similarly small set (epilogue). In the Berkeley design, these calls would cause a new set of registers to be "swapped in" at that point, or marked as "dead" (or "reusable") when the call ends.

Processors such as PowerPC save state to predefined and reserved machine registers. When an exception happens while the processor is already using the contents of the current window to process another exception, the processor will generate a double fault in this very situation.

In an example RISC embodiment, only eight registers out of a total of 64 are visible to the programs. The complete set of registers are known as the register file, and any particular set of eight as a window. The file allows up to eight procedure calls to have their own register sets. As long as the program does not call down chains longer than eight calls deep, the registers never have to be spilled, i.e. saved out to main memory or cache which is a slow process compared to register access. For many programs a chain of six is as deep as the program will go.

By comparison, another architecture provides simultaneous visibility into four sets of eight registers each. Three sets of eight registers each are "windowed". Eight registers (i0 through i7) form the input registers to the current procedure level. Eight registers (L0 through L7) are local to the current procedure level, and eight registers (o0 through o7) are the outputs from the current procedure level to the next level called. When a procedure is called, the register window shifts by sixteen registers, hiding the old input registers and old local registers and making the old output registers the new input registers. The common registers (old output registers and new input registers) are used for parameter passing. Finally, eight registers (g0 through g7) are globally visible to all procedure levels.

An improved the design allocates the windows to be of variable size, which helps utilization in the common case where fewer than eight registers are needed for a call. It also separated the registers into a global set of 64, and an additional 128 for the windows.

Register windows also provide an easy upgrade path. Since the additional registers are invisible to the programs, additional windows can be added at any time. For instance, the use of object-oriented programming often results in a greater number of "smaller" calls, which can be accommodated by increasing the windows from eight to sixteen for instance. The end result is fewer slow register window spill and fill operations because the register windows overflow less often.

Instruction set architecture (ISA) processor out-of-order instruction implementations may execute architected instructions directly or by use of firmware invoked by a hardware instruction decode unit. However, many processors "crack" architected instructions into micro-ops directed to hardware units within the processor. Furthermore, a complex instruction set computer (CISC) architecture processor, may translate CISC instructions into reduced instruction set computer (RISC) architecture instructions. In order to teach aspects of the invention, ISA machine instructions are described, and internal operations (iops) may be deployed internally as the ISA machine instruction, or as smaller units (micro-ops), or microcode or by any means well known in the art. and will still be referred to herein as machine instructions. Machine instructions of an ISA have a format and function as defined by the ISA, once the ISA machine instruction is fetched and decoded, it may be transformed into iops for use within the processor.

In an embodiment, an instruction set architecture (ISAs) has the capability to indicate operand "liveness". Operand "liveness" may include, for example, an indication that the operand value will not be used again, an indication of how many more read access, write access or both will be made, an indication that the operand will not be accessed for a predetermined period of time (number of instructions, elapsed time, etc.), an indication of how critical to performance access to the operand is (low, medium high) etc. In a storage cache hierarchy, operand liveness might indicate that a store operation is a last storage to the line, that stores to the cache line need not be maintained in main storage (scratch pad). Indicating that an operand value will be used for the last time promise improved capability to manage soft error recovery, multi-level register files, main storage caches and register renaming logic.

In embodiments, compilers are provided that track information in order to provide information to the processor identifying operand liveness (what values will not be used again for example). In one embodiment, the compiler inserts liveness instructions for indicating the liveness information to the processor executing the compiled instructions.

In an embodiment, the capability to perform a context switch includes the ability to save and restore information about liveness including what values are not used for a specific software module. A software module can be, for example, a subroutine, a thread, a process, or a partition (image) in a system.

When a program A is interrupted in order to execute program B, a context switch is performed. The context (the current state) of architected facilities (including register values, condition code values, and program counter value pointing to the next instruction address (NI) for example) are saved for program A and the context for program B is loaded. When returning to program A, the saved program A context is loaded and program A begins execution at the NI that was saved.

In an embodiment, an active program can designate architected facility values as "last-use" values. For example, a program knows that a value in register 3 will not be used again so it executes an instruction that disables register 3 of the architected 64 general registers of the ISA. The processor, then, no longer needs to keep the state of register 3 current, and may specify a default value to be used. When the processor performs a context switch, register 3 need not be saved or restored. In an embodiment, information is saved indicating that register 3 is inactive when context is restored and the program is re-activated.

In an embodiment, when a transient fault occurs during instruction execution, "register liveness" information can be used to suppress error recovery and/or error notification. Error recovery would degrade performance, Error notification can result in a machine outage if a process, a partition or a system is stopped due to an unrecoverable error.

In an embodiment, accesses to "dead values" (disabled registers) is provided by a program, the program providing "last-use" information about an operand (where the operand value will no longer be needed by the program). The last-use information may enable systems to optimize operations by not having to retain unused values, or by suppressing error notifications to last-used operands. However, a "last-use" indication does not guarantee a value that was indicated as last-used will not be read-access again. Specifically, at code module boundaries, values are often saved when entering a new module, and restored when exiting form a module and returning to a previous module.

Examples

On transitions between functions, callee-saved ("non-volatile") functions are saved by the called function on function entry, and restored on function exit When a transition from an application (process or thread) to the operating system kernel (or hypervisor) is made, all registers are saved, and restored when control transfers back to an application When a transition from a system partition (e.g., an operating system in that partition) to the virtual machine monitor (VMM) or hypervisor is made, all registers are saved, and restored when control transfers back to an application When an operating system switches execution from one thread to another thread, all registers associated with a thread are stored, and the stored registers associated with said another thread are loaded.

When a hypervisor or virtual machine monitor (VMM) system switches execution from one partition to another partition, all registers associated with a partition are stored, and the stored registers associated with said another partition are loaded.

During the execution of a CALL PROGRAM under System z, state gets saved.

Because during the switch from one first module to another module, the another module does not know what registers a first module may be using, the module will save and restore all registers During these accesses, when a transient fault is registered to save the module state for a future restoration of a module's state, unused state gets accessed.

To avoid error recovery and error notification, it is preferable to suppress at least one of error recovery and notification.

It is critical to suppress error notification during such situations in order to reduce the performance degradation in handling these false errors In an embodiment, there is provided a means to track, for each register, whether the register has been indicated to be no longer live (i.e., a last-use has been indicated).

In an embodiment, a liveness information register (LIR) special purpose register (SPR) is provided. The liveness register is preferably maintained in a hardware latch, and contains one bit for each register indicating whether a register is live. The LIR value, in an embodiment is context of a program and is saved and restored during context switching. In another embodiment, the LIR value includes an identifier identifying a context or thread associated with the LIR.

Figure 4A:
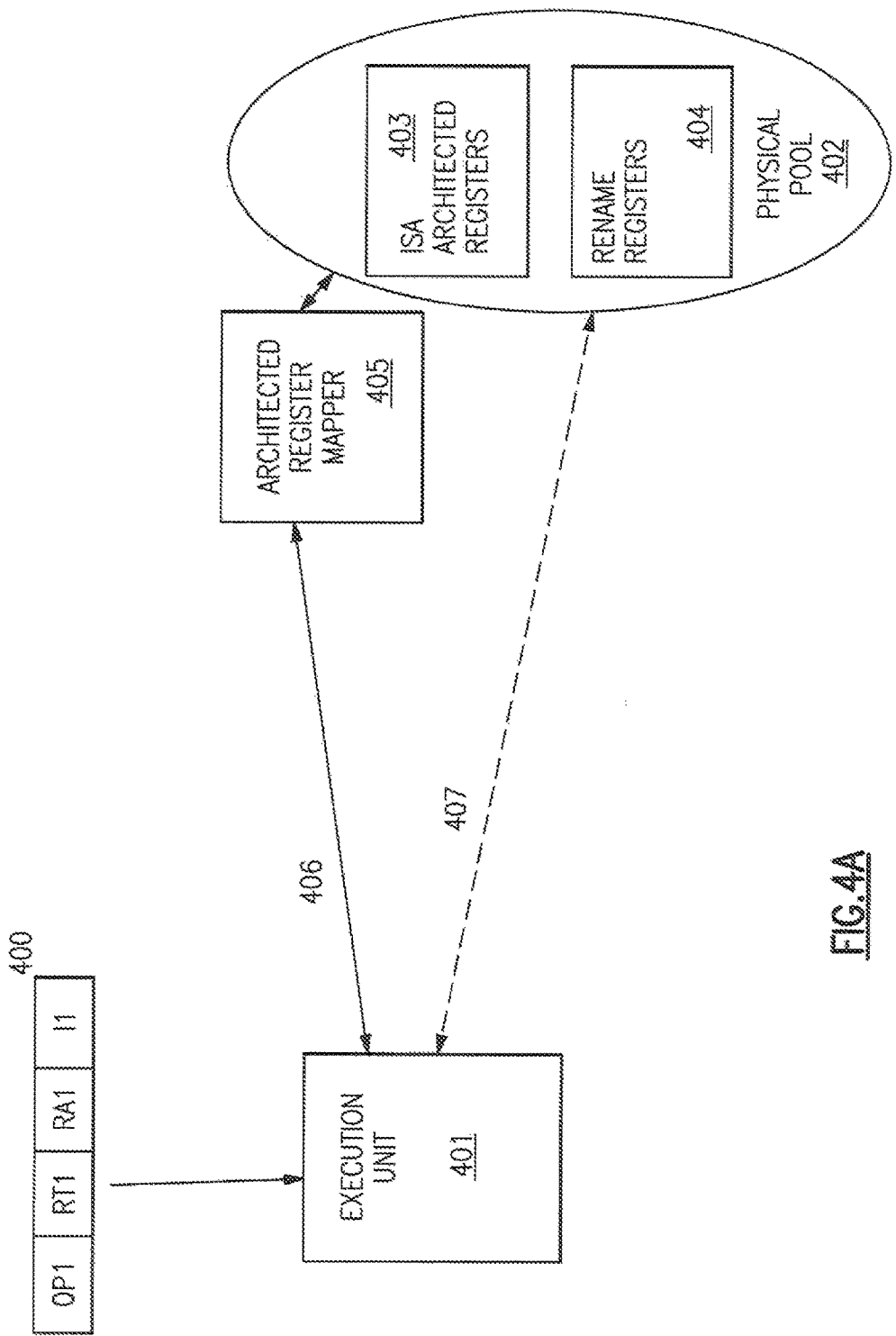
FIGS. 4A-4C depicts an example architected register facility implementation.

Referring to FIG. 4A, a processor may have a physical register pool 402 that are dynamically allocated as rename registers 404 for speculative execution, and ISA architected registers 403. The dynamic allocation is performed by an architected register mapper 405, wherein rename registers become architected registers upon completion of a corresponding Out of Order (OoO) instruction execution.

An architected machine instruction 400 of an ISA includes, for example, an opcode (OP1) indicating the function to be performed by executing the instruction, an immediate field (I1), a source register field (RA1) for locating a source operand in an architected register location specified by the register field, the source operand to be used in the execution of the instruction, and a target register field (RT1) for locating an architected register for storing a result operand of executing the instruction.

An Execution Unit 401 receives the instruction 400 (or internal operation "micro-ops" (iops) generated by the processor, and determines that it needs to access an operand at an architected register location (RA1) or RA2). The Execution unit 401 sends the register field value to an Architected Register Mapper 405, which determines which physical register is associated with the architected register to be accessed, and directs the access to that architected register.

Figure 4B:
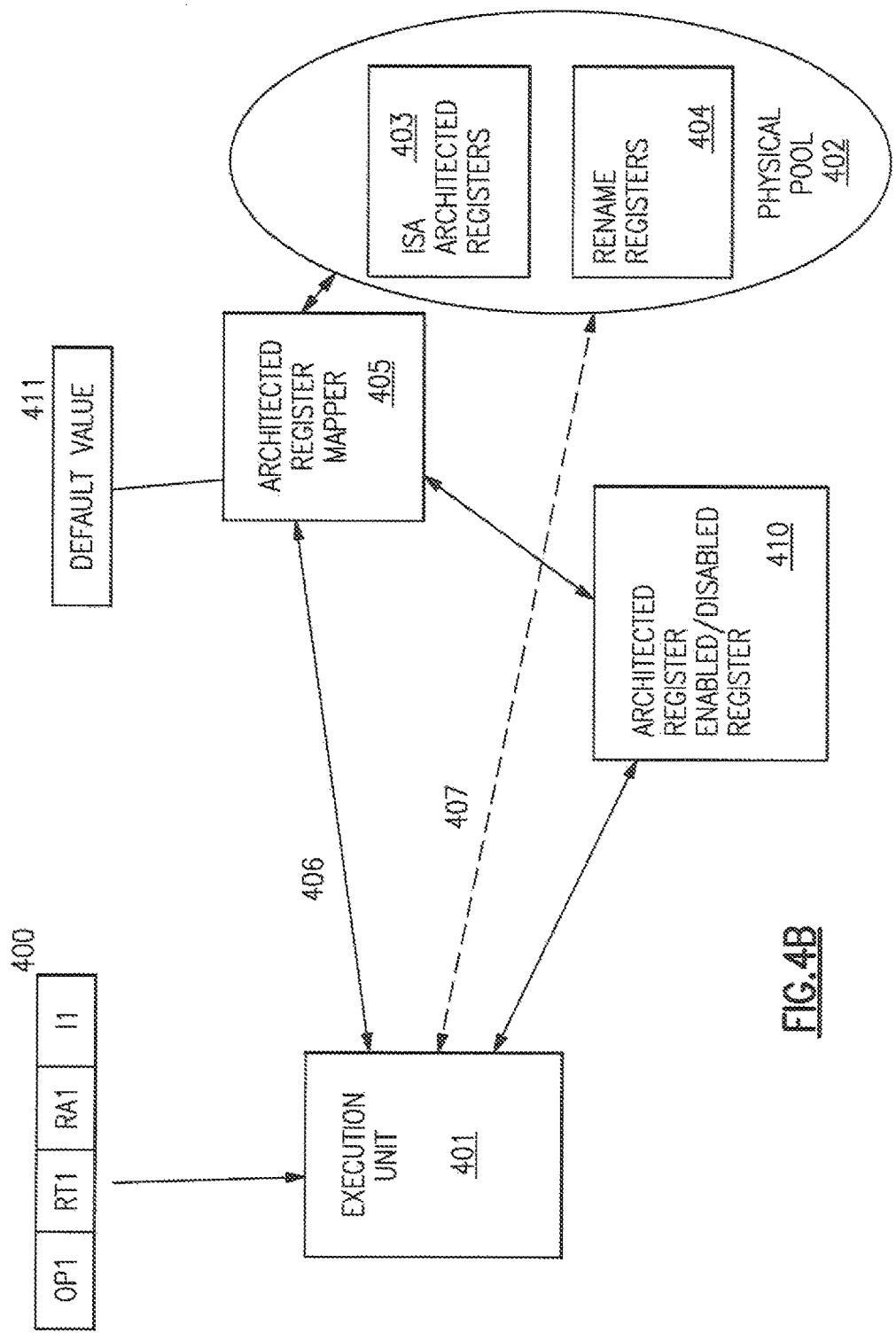

Referring to FIG. 4B, an architected register enabled/disabled register (AREDR) 410 is introduced. The AREDR 410 determines whether an access (by an execution unit 401) of an architected register is permitted or not. In an embodiment, if an architected register access is disabled, the AREDR 410 causes a response, other than returning a previously stored architecture register operand value or storing an architecture register operand. Responses may include, for example, returning a default value 411, returning all 1's or all 0's, returning an incremented value, returning a decremented value, suppressing errors or returning a program exception event signal.

Figure 4C:
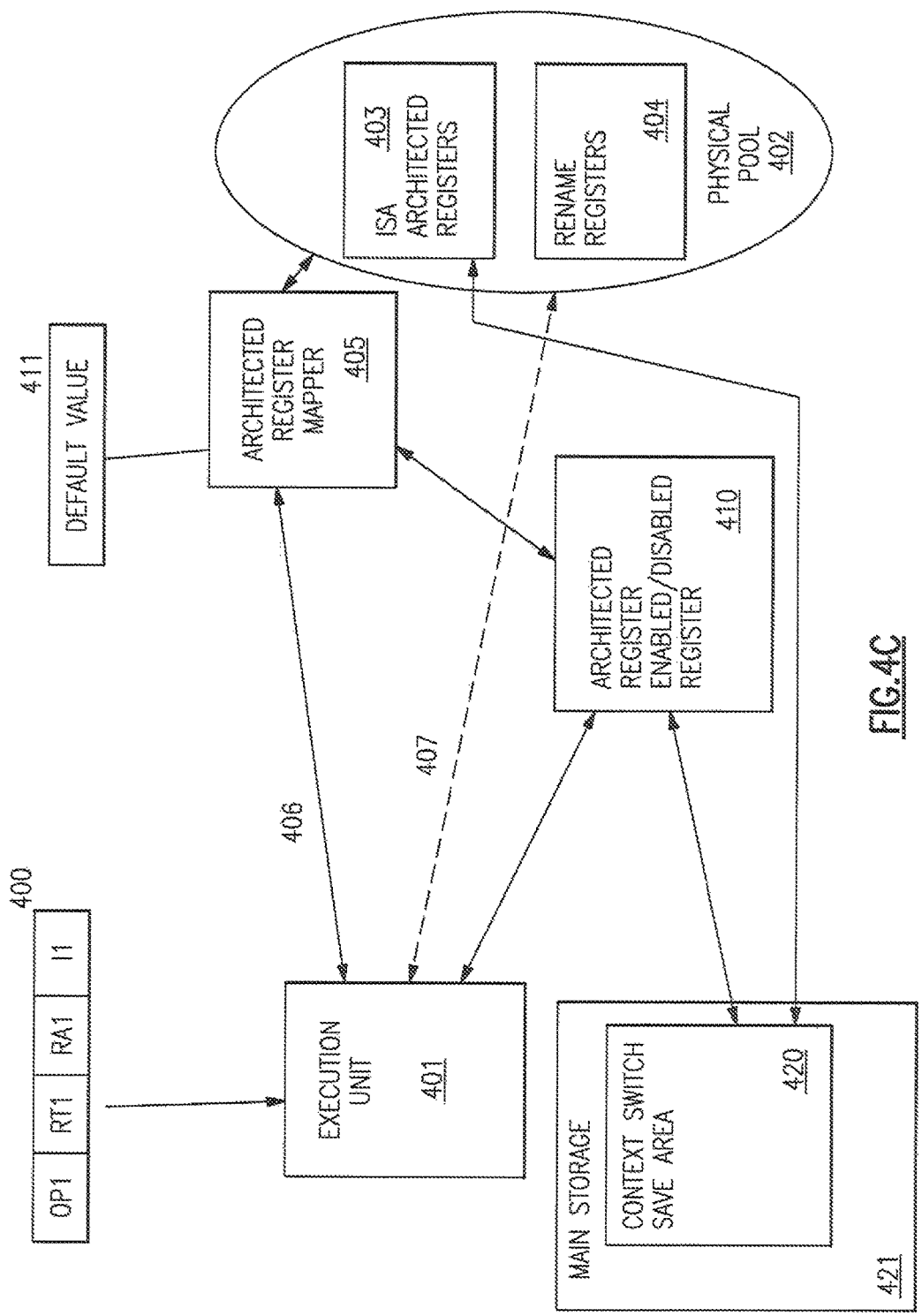

Referring to FIG. 4C, during a context switch, (or responsive to a call instruction being executed), the state of enablement of the architected registers held in the AREDR 410 are saved and restored in a save area 420, of, for example, main storage 421. In an embodiment, the current value of the architected registers are also saved and restored, along with other state information such as program status word (PSW) state including, the current program counter value and current condition code (flags) value.

Figure 5:
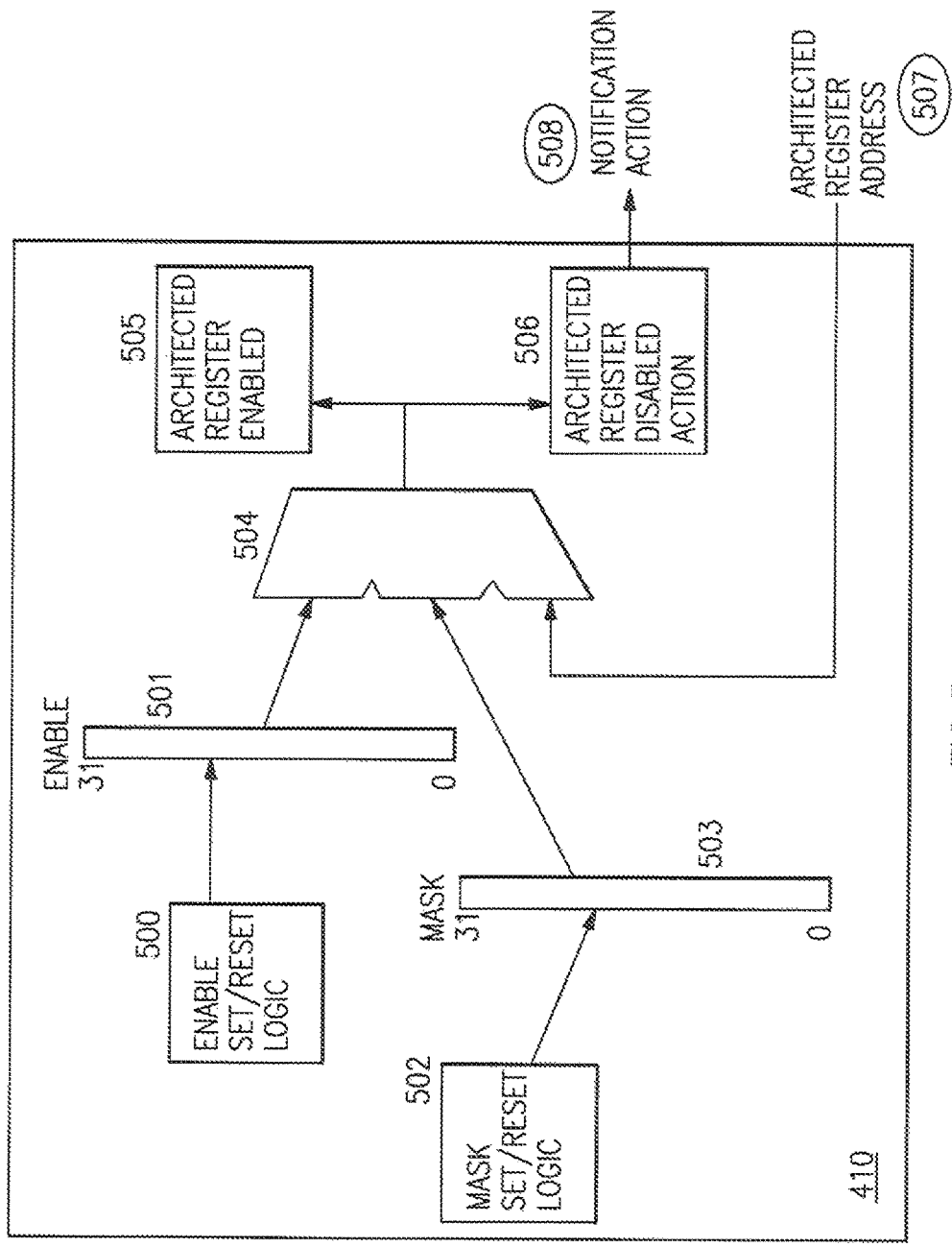
FIG. 5 depicts an example architected register enable/disable implementation.
Figure 6:
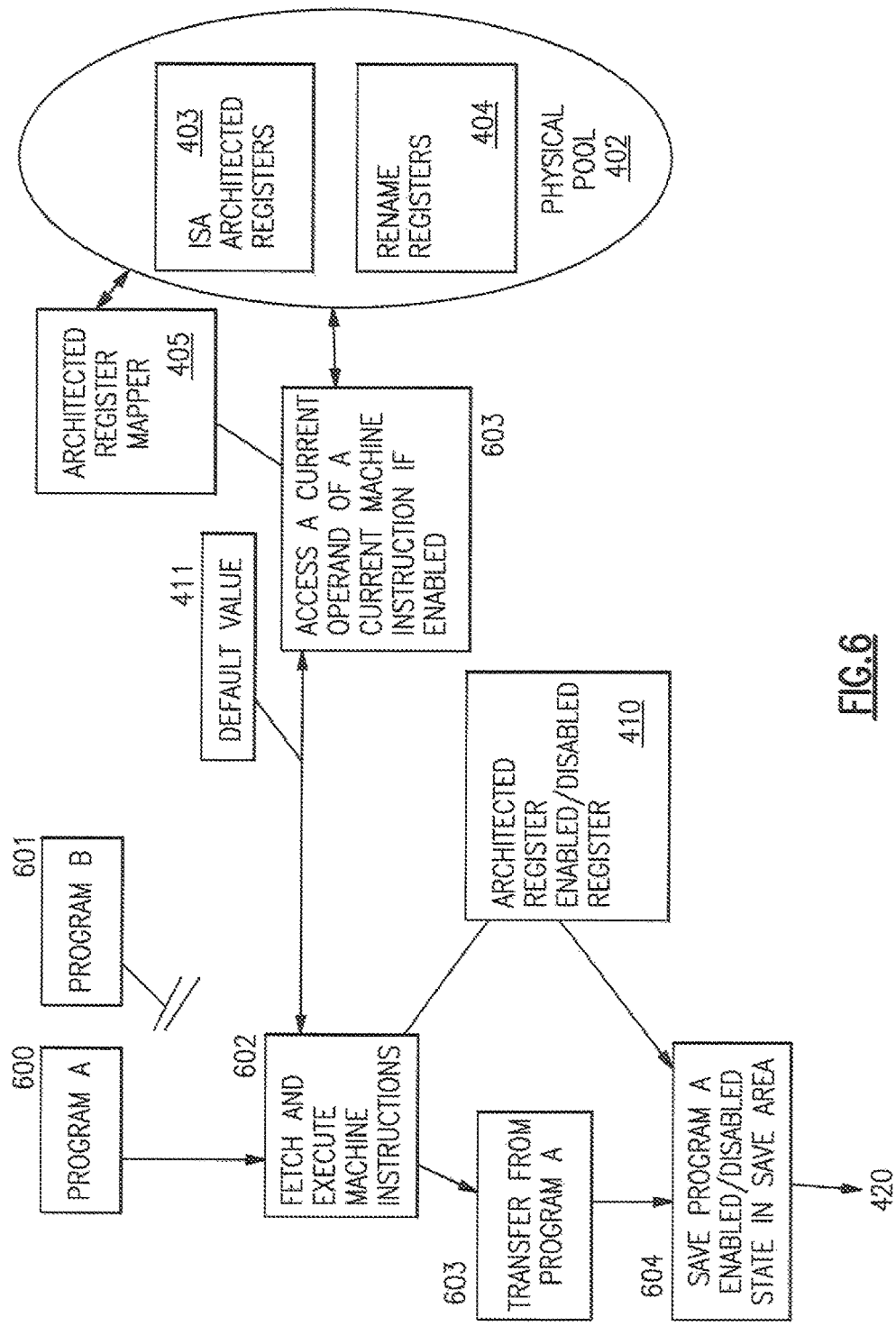
FIG. 6 depicts an example transition from a first program flow diagram.
Figure 7:
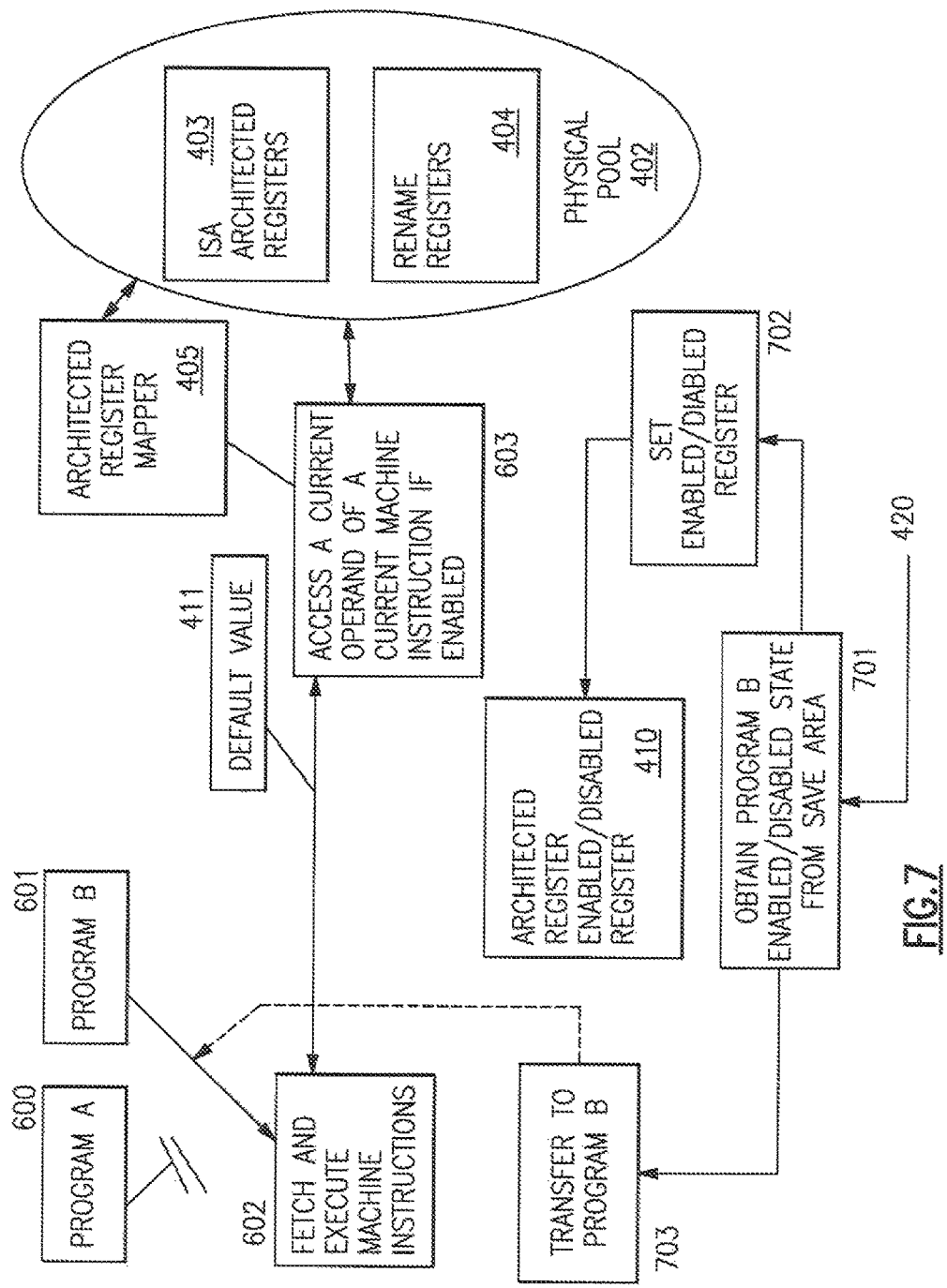
FIG. 7 depicts an example transition to a second program flow diagram.
Figure 8:
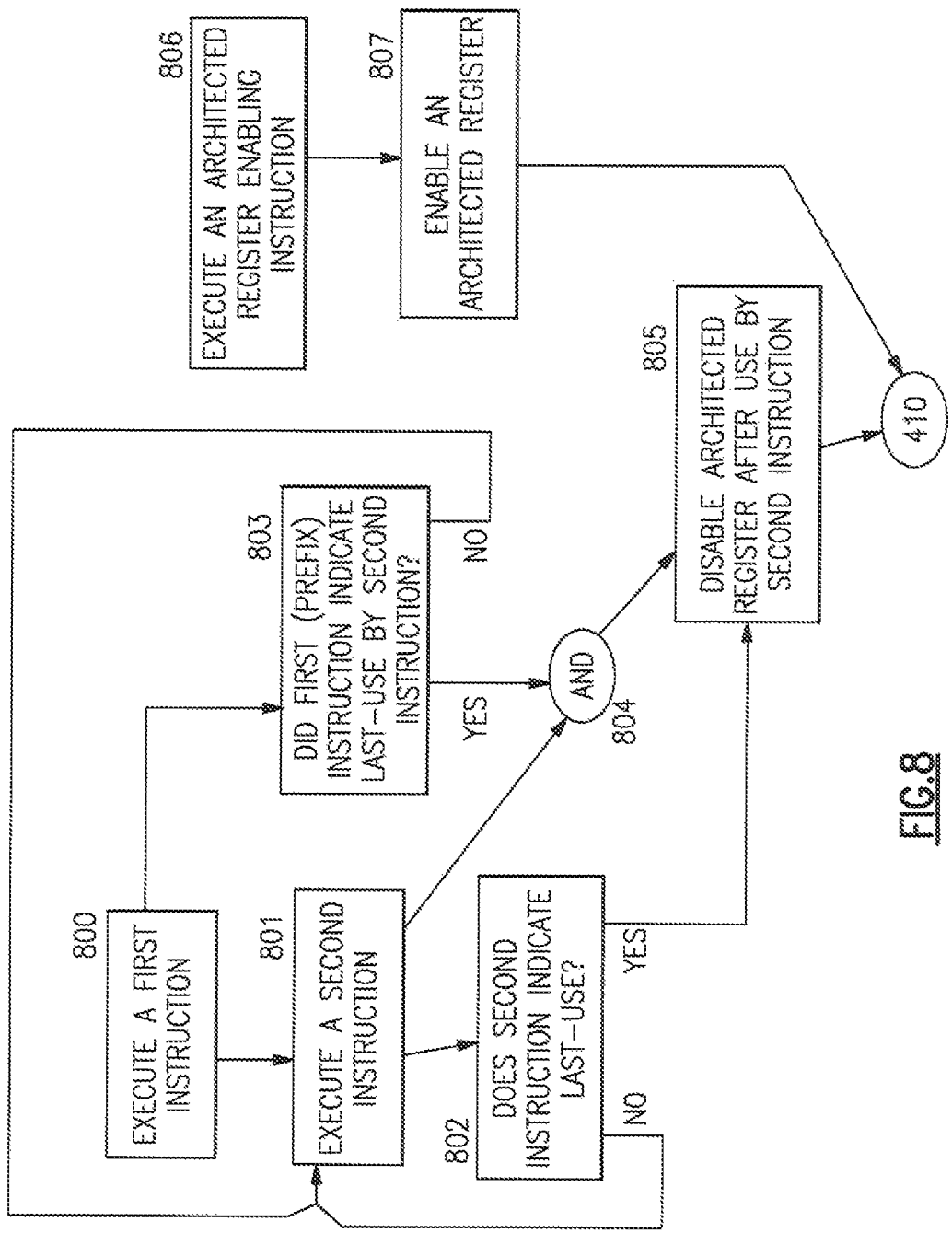
FIG. 8 depicts an example flow diagram of instructions enabling and disabling architected registers.

Referring to FIG. 5, the AREDR 410, in an embodiment includes an enable register 501, having a bit corresponding to each architected register, wherein a bit being a '0' indicates the register is disabled, and a bit being a '1' indicates the register is enabled. The enable register 501 is set or reset by enable set/reset logic 500. In an embodiment, a last-use instruction specifies the last-use of an architected register, when executed, causes the corresponding enable register 501 bit to be set to '0'. In an embodiment, an instruction specifying a write to the architected register causes the corresponding enable register 501 bit to be set to '1'. In an embodiment, the enable register 501 can be read or written by instructions used by an operating system (OS).

When an instruction requests access to an architected register, an architected register address 507 is compared 504 with the enable register 501, by a comparator 504 to determine whether the architected register is enabled 505 or disabled 506.

In an embodiment a mask register 503 is provided. The mask register 503 is set or reset by mask set/reset logic 502 responsive to an operating system instruction being executed. Each bit of the mask register 503 corresponds to an architected register and controls whether a program can enable corresponding registers. The mask register 503 is compared with the enable register 501 by a comparator for determining whether an architected register address 507 is enabled 505 or disabled 506.

The architected register enabled logic 505 permits use of the architected register. The architected register disabled action logic 506 causes an action other than using the architected register as described supra.

In an embodiment, the state of the mask register 503 is saved and restored during a context switch along with the state of the enable register 501.

In another embodiment, register liveness is implicitly maintained, e.g., as part of the state of a register renaming logic and is associated with a thread or a program. For example, in a register renaming table.

In an embodiment, a liveness information value is extracted from the state management structure, such as a register renaming table for performing a context switch. By accessing the mapping information, for each architected register a determination is made whether the register is bound to a physical register and is live, in which case a '1' will be inserted in the liveness information value position for that register in a storage for holding context state (in a liveness information register (LIR) for example). In another aspect, when an architected register is not indicated to be live, and not bound to a physical register, a '0' is inserted at the corresponding position. In accordance with one embodiment, even when not LIR register is explicitly maintained, the architecture is specified to contain the LIR register, and a read to said LIR register will cause a liveness indication value to be generated and returned as the result of a read form this register. Those skilled in the art will recognize that other encoding than the ones described here can be used in conjunction with the teachings contained herein.

Liveness information is used in conjunction with reliability actions in an embodiment. Data accesses may be performed in conjunction with an R-unit function. The R-unit preferably includes the register liveness indicator register. When an error condition indicating a transient fault is encountered, a determination is made if the error condition corresponds to an error in a live or a non-live register (or other data store). When the data error is indicated for a live value, a reliability action is performed, wherein the Reliability action is preferably one of error notification and error correction. When the data error is indicate for a non-live register, the Reliability action may be suppressed. Suppressing error correction will save energy and improve performance lost in order to correct an unneeded value. Suppressing error notification for a non-live value will increase system reliability for non-recoverable errors, because transient corruption of architected state usually forces the termination of execution in one of a process, a partition and a system. In one embodiment, a "logging" notification is still recorded when an error has indicated to not require a reliability action, so as to detect degrading systems and initiate service actions, or take frequently failing components out of service proactively In one embodiment for a non-live register access suppressing an error, a "logging" notification is still recorded when an error has indicated to not require a reliability action. The log can be used to detect degrading systems and initiate service actions, or take frequently failing components out of service proactively.

In accordance with one embodiment, in at least one scenario the condition of accessing a register which is not live may correspond to a programming error. As such, a microprocessor implementation may be adapted to raise a notification event (e.g., an exception to one of a debugger, an operating system, a hypervisor, or another supervisory program) to indicate a possible programming error.

Not all references to free (disabled) registers are the result of a programming error. Programs may be required to save registers when they do not know whether those registers are in use, and may proceed to save to memory ("spill") and later reload ("fill") these registers (e.g., during context switch or function call/return). In one embodiment, there is provided one of a configuration register and a mode switch to override a possible exception, and force the returning of a default value when accessing a free architected register. In another aspect of the invention, a control bit (e.g., in the architected program status word (PSW), a architected control register (CR), or the architected machine state register (MSR) status registers, or in an implementation controlled HID bit) is set to select the behavior by an application. In another aspect, a prefix to a sequential instruction provides the ability to indicate that an unused reference might occur. In yet another aspect, an instruction with a well defined opcode has the ability to access a register that is thus freed and deallocated.

In another embodiment, notification raising and non-notification raising instructions are provided that raise or suppress notifications corresponding to non-live, disabled operands. A compiler generates an instruction that does not raise a programming error indication event (e.g., said exception) but rather returns a default value when a context switch (or callee-save spill/fill register sequence) is performed. In accordance with one aspect, the compiler may use one of the described means (set control, use a prefix, or use a special opcode) to perform key operations that may reference unused registers—e.g., register save and restore for callee-saved (non-volatile) registers in functions prologues and epilogues, during a make-context/get-context operation, or during a set-jump/long-jump operation. In another embodiment, the compiler library or function will also be optionally adapted to emit and/or use and/or execute code to save a digest of register liveness information ("STORE LIVENESS"), and restore such information when registers are being reloaded ("LOAD LIVENESS").

In other aspects, operating systems and hypervisors use similar sequences of instructions to save and restore context in context switch. In one aspect of such a use, operating systems and hypervisors are expected to be free of programming errors, and never raise a programming error notification, but rather always substitute a default value. This would be desirable for a known highly reliable operating system such as zOS and AIX. In another aspect, where the make of an operating system expects there to be many programming errors in an operating system, he would use a method similar to application programs, with OS and hypervisor being adapted to indicate a programming error (e.g., using a notification method), and using instructions adapted to not raise programming error notifications for operations such as context switches, which are known to be referencing unused/free/deallocated registers. These methods would be desirable for the make of an operating system commonly known under the name "Microsoft Windows". Also, makers of very stable operating systems such as zOS and AIX may choose to enable notification during their lengthy quality assurance cycle, to aid in debug and preserve the known industry-leading stability in the zOS and AIX operating systems. In another aspect, the mode may be switched, e.g., in a Linux operating system, where a more stable base Linux operating system may call external modules and drivers to be executed in the OS environment, the operating system may switch to a mode wherein programming error notification are enabled during execution of said drivers or modules.

Saving and restoring liveness information in an embodiment, is provided by reading and writing the liveness indication register. In accordance with one embodiment, a move from (or to) SPR (special purpose register) instruction or CONTROL instruction may be provided. In accordance with one embodiment, a system uses a move from liveness instruction to save liveness information in memory (or in a register). In accordance with another embodiment, liveness information is copied to a status save/restore register (SRR) from a liveness indication register when a context switch to a supervisor mode is made. Liveness information may be copied from a status save/restore register (SRR) to a liveness indication register when a context switch from a supervisor mode is made (rfi/hrfi).

In an embodiment for saving liveness information no explicit liveness indication register is maintained. Instead, there is included logic for obtaining information from implicit state and constructing a liveness indication register when a move from liveness indicator instruction is performed Preferably, an indication of which architected registers are enabled or not enabled is saved to a save area for a program (X) being interrupted, and an indication of which architected registers are enabled or not enabled is obtained from the save area for new program (Y) is fetched during a context switch, wherein the save area may be implemented as an architected register location or a main storage location available to an operating system (OS). The indication may be a bit significant field where each bit corresponds to an architected register entry, or a range, or otherwise indicating the enabled/active architected registers. In an embodiment, only a subset, determined by the OS, may be enabled. In an embodiment each thread of a multi-threaded processor has its own set of enabled, disabled indicators. In another embodiment, the value of active indicators of an active program or thread can be explicitly set by machine instructions available to the active program or thread.

In one embodiment, context switching may be performed, entirely by hardware. The ISA designates the architected state information that must be saved and restored. The save area is designated for the hardware. Whenever a context switch is invoked, the current state is saved in the save area and the new state is obtained from the save area. In one example, there are architecturally designated save areas, or levels of saved areas, and a program is executed at a designated level. An interruption initiated by, for example, a timer event, causes the state information for the program to be saved, and the operating system (OS) at another level, to be invoked, by obtaining the saved state information for the another level and then beginning execution of the OS.

In an embodiment, the context switch is performed, at least in part, by software. When a context switch is invoked, state information at the current level is saved by software, and the state information for the new level is obtained by software.

To assist software in saving and restoring state, special instructions are sometimes provided by ISAs. In one embodiment, a special register may be provided for a PowerPC ISA to hold an indication of the liveness of general registers of the ISA. The special register can be saved to memory by a new MFSPR instruction, as shown in FIG. 9, and the special register can be loaded from memory by a new MTSPR instruction, as shown in FIG. 12.

In the PowerPC UISA, the SPR field denotes a special-purpose register, encoded as shown in Table 8-9. The contents of the designated special purpose register are placed into rD. A new LIR SPR field (LR) identifies a liveness special purpose register.

TABLE 8-9

PowerPC UISA SPR Encodings for mfspr

| | SPR** | | |
|---|---|---|---|
| Decimal | spr[5-9] | spr[0-4] | Register Name |
| 1 | 00000 | 00001 | XER |
| 8 | 00000 | 01000 | LR |
| 9 | 00000 | 01001 | CTR |

**Note:
The order of the two 5-bit halves of the SPR number is reversed compared with the actual instruction coding.

If the SPR field contains any value other than one of the values shown in Table 8-9 (and the processor is in user mode), one of the following, which may include Store Doubleword as shown in FIG. 10 and MFSPR as shown in FIG. 11, occurs:
The system illegal instructino error handler is invoked.
The system supervisor level instruction error handler is invoked.
The results are boundedly undefined.
Other registers altered:
None
Simplified mnemonics:
mfxr rD equivalent to mfspr rD,1
mflr rD equivalent to mfspr rD,8
mfctr rD equivalent to mfspr rD,9

The SPR field denotes a Special Purpose Register, encoded as shown in the table below. The contents of the designated Special Purpose Register are placed into register RT. For Special Purpose Registers that are 32 bits long, the low-order 32 bits of RT receive the contents of the Special Purpose Register and the high-order 32 bits of RT are set to zero. A new LIR SPR field (LR) can be added to specify an SPR holding a current Architected register liveness indication, wherein each bit being a 1, indicates the architected register is not enabled for example.

TABLE 8-10

| | SPR[1] | | Register |
|---|---|---|---|
| Decimal | spr5:9 | spr0:4 | Name |
| 1 | 00000 | 00001 | XER |
| 8 | 00000 | 01000 | LR |
| 9 | 00000 | 01001 | CTR |
| 13 | 00000 | 01101 | AMR |
| 136 | 00100 | 01000 | CTRL |
| 256 | 01000 | 00000 | VRSAVE |
| 259 | 01000 | 00011 | SPRG3 |
| 260 | 01000 | 00100 | SPRG4 |
| 261 | 01000 | 00101 | SPRG5 |
| 262 | 01000 | 00110 | SPRG6 |
| 263 | 01000 | 00111 | SPRG7 |
| 268 | 01000 | 01100 | TB |
| 269 | 01000 | 01101 | TBU |
| 512 | 10000 | 00000 | SPEFSCR |
| 526 | 10000 | 01110 | ATB |
| 527 | 10000 | 01111 | ATBU |
| 896 | 11100 | 00000 | PPR |
| 898 | 11100 | 00010 | PPR32 |

[1]Note that the order of the two 5-bit halves of the SFR number is reversed.

The SPR field denotes a Special Purpose Register, encoded as shown in the table below. Unless the SPR field contains 13 (denoting the AMR<S>), the contents of register RS are placed into the designated Special Purpose Register.

For Special Purpose Registers that are 32 bits long, the low-order 32 bits of RS are placed into the SPR. The AMR (Authority Mask Register) is used for "storage protection" in the Server environment. The new LIR SPR field (LR) can be added to specify an SPR for holding a new Architected register liveness indication, wherein each bit being a 1, indicates the architected register is not enabled for example.

TABLE 8-11

| decimal | SPR[1] | | Register Name |
|---|---|---|---|
| | $spr_{5:9}$ | $spr_{0:4}$ | |
| 1 | 00000 | 00001 | XER |
| 8 | 00000 | 01000 | LR |
| 9 | 00000 | 01001 | CTR |
| 13 | 00000 | 01101 | AMR[5] |
| 256 | 01000 | 00000 | VRSAVE |
| 512 | 10000 | 00000 | SPEFSCR[2] |
| 896 | 11100 | 00000 | PPR[3] |
| 898 | 11100 | 00010 | PPR32[4] |

[1]Note that the order of the two 5-bit halves of the SPR number is reversed.
[2]Category: SPE.
[3]Category: Server; see Book III-S.
[4]Category: Phased-In. See Section 3.1 of Book II.
[5]Category: Server; see Book III-S.

In accordance with one embodiment, when the LIR (SRR0_LIVENESS) register is written, an indication is performed that all registers that are indicated as not live in the written LIR value are no longer live, and any physical registers corresponding to architected registers that have been indicated as to be not live may optionally be deallocated.

A write operation indicating a register which is 1) not live prior to the execution of the write and 2) is indicated to be live in the value written to the LIR register either does not change the corresponding LIR entry in one embodiment, or causes a notification event to indicate a programming error in another embodiment.

A context switch or transfer of control operation can be implemented in software, firmware or hardware circuitry. A hardware implementation can not only advantageously take advantage of the last-used information to return physical registers, of an architected register that is disabled, to a pool of available physical registers for use by other threads for both architected registers and rename registers, but also, during a context switch, only saving and restoring hardware registers, during a context switch, that are enabled. Example A1 for transferring (context switching) from Program A to Program B based on PowerPC ISA, first the state information of Program A is saved as follows:

Set up context save base address for module 1 in r11
Then
stw r13,GPR13(r11);
stw r14,GPR14(r11);
stw r15,GPR15(r11);
stw r12,GPR12(r11);
stw r9,GPR9(r11);
mfspr r10,SPRN_SPRG_SCRATCH0;
stw r10,GPR10(r11);
mfspr r12,SPRN_SPRG_SCRATCH1;
stw r12,GPR11(r11);
Then the state information for Program B is loaded as follows:
Set up context save base address for module 2 in r11
Then
lw r13,GPR13(r11);
lw r14,GPR14(r11);
lw r15,GPR15(r11);
lw r12,GPR12(r11);
lw r9,GPR9(r11);
mfspr r10,SPRN_SPRG_SCRATCH0;
mfspr r12,SPRN_SPRG_SCRATCH1;
rfi In Example A2 as follows a transition from Program B back to Program A is accomplished as follows:
First state information is saved for Program B as follows:
Set up context save base address for module 2 in r11
Then
stw r13,GPR13(r11);
stw r14,GPR14(r11);
stw r15,GPR15(r11);
stw r12,GPR12(r11);
stw r9,GPR9(r11);
mfspr r10,SPRN_SPRG_SCRATCH0;
stw r10,GPR10(r11);
mfspr r12,SPRN_SPRG_SCRATCH1;
stw r12,GPR11(r11);
Then state information is loaded for Program A as follows:
Set up context save base address for module 2 in r11
Then
lw r13,GPR13(r11);
lw r14,GPR14(r11);
lw r15,GPR15(r11);
lw r12,GPR12(r11);
lw r9,GPR9(r11);
mfspr r10,SPRN_SPRG_SCRATCH0;
mfspr r12,SPRN_SPRG_SCRATCH1;
rfi In the Examples A1, A2 for transferring (context switching) from Program A to Program B, state information was saved for each architected register whether an architected register was enabled or disabled. However, based on LIR, a context switch need not save a disabled register, since the LIR interrogated to discover liveness as shown in Example A2 as follows:

Example B1 for transferring (context switching) from Program A to Program B, first the state information of Program A is saved as follows:
Set up context save base address
for module 1 in r11
stw r13,GPR13(r11);
stw r14,GPR14(r11);
stw r15,GPR15(r11);
stw r12,GPR12(r11);
stw r9,GPR9(r11);
mfspr r10,SPRN_SPRG_SCRATCH0;
stw r10,GPR10(r11);
mfspr r12,SPRN_SPRG_SCRATCH1;
stw r12,GPR11(r11);
mfspr r12, SRR_LIVENESS
stw r12, SRR_LIVENESS(r11)
In this example, the liveness information is obtained by the mfspr 12 instruction and stored by the stw r12 instruction so it is available for an eventual return to Program A. Then state information is loaded for Program B as follows:
Set up context save base address for module 2 in r11
Then
lw r12,GPR13(r11);
Mtspr SRR_LIVENESS
lw r13,GPR13(r11);
lw r14,GPR14(r11);
lw r15,GPR15(r11);
lw r12,GPR12(r11);
lw r9,GPR9(r11);
mfspr r10,SPRN_SPRG_SCRATCH0;
mfspr r12,SPRN_SPRG_SCRATCH1;
rfi In loading the state information, the lw r12 provides an address of the saved LIR state information for Program B and the Mtspr instruction loads the LIR from the save area.

In a hardware implementation the transfer may be made by logic circuits. In one embodiment the LIR for a target program is loaded first and only the live registers are loaded. In an embodiment, only live registers are saved for a program that is being transferred from.

In an embodiment, liveness information 501 is maintained 410 for executing programs, the method comprising maintaining 410, by a processor, current operand state information 501 503, the current operand state information for indicating whether corresponding current operands 507 are any one of enabled 505 or disabled 506 for use by a first program module 600, the first program module 600 comprising machine instructions of an instruction set architecture (ISA), the first program module 600 currently being executed 602 by the processor. A current operand is accessed 603, by a machine instruction of said first program module, the accessing comprising using 504 the current operand state information 501 503 to determine whether a previously stored current operand value is accessible 505 506 by the first program module.

In an embodiment, responsive to the current operand 507 being disabled 506, the accessing comprising at least one of returning an architecture-specified value 411, and where the architecture-specified value 411 is any one of an undefined value, a zero value, a value consisting of all '1's, or a program specified default value; and performing a notification action 508, wherein the notification action 508 is any one of raising an exception, suppressing an exception, raising and suppressing an exception under control of machine state, providing debug information, and setting at least one register to indicate occurrence of an access to a disabled operand.

In an embodiment, program execution 602 is transferred 603 from the first program module 600 to a second program module 601, comprising saving 604 the current operand state information 501 503 of the first program module 600 in a context switch save area 420, loading 701 702, from the context switch save area 420, new operand state information as current operand state information of a second program to be executed; and initiating 703 execution of the second program 601 using the loaded current operand state information 501 503.

In an embodiment, the transferring 603 703 execution is a context switch operation, wherein the current operands consist of any one of architected general register values of general registers 403 identified by instructions 400 or architected floating point register values of floating point registers identified by instructions 600, wherein the transferring execution further comprises saving a program counter value and current operand values of enabled current operands 403 of the first program module 600 in the context switch save area 420; and loading 701 702, from the context switch save area 420, new operand values of new enabled operands as current operand values of current operands 403 of the second program 601 to be executed, wherein the initiated execution 602 of the second program 601 uses the loaded current operands 403.

In an embodiment the current operand state information 501 503 further comprises an operand enablement control 503 for controlling whether current operand state information 501 can be changed between enabled and disabled by a current program 600 601.

In an embodiment, when a first operand disable instruction 801 is executed, the execution causes current operand state information 501 of a first operand 403 to disable the first operand 403, wherein reads of disabled operands 403 return an architecture dependent default value 411; and when second operand enable instruction 806 is executed, the execution causing 8007 current operand state information 501 of a second operand to enable 505 the second operand 403, wherein reads of enabled operands return values previously stored to said enabled operands 403.

In an embodiment, the default value 411 consists of any one of an architecture undefined value, a value previously stored in an architecture defined default value register, all 1's all 0's, an incremented value or a decremented value, wherein the incremented value is incremented with each read access, wherein the decremented value is decremented with each read access.

In an embodiment, the first operand disable instruction is a prefix instruction 800, the execution of the prefix instruction 800 indicating to the processor, that the first operand is to be disabled after use by a next sequential instruction 801 following the prefix instruction in program order.

In an embodiment, write operations to disabled operands cause the disabled operand to be enabled, wherein the second operand enable instruction 806 is a write instruction for writing to the second operand 503.

In an embodiment, an access to a disable architected register causes a program exception to be indicated.

In an embodiment, a disabled architected register is enabled by execution of a register enabling instruction that does not write to the disabled architected register.

In a commercial implementation of functions and instructions, such as operating system programmers writing in assembler language. These instruction formats stored in a storage medium 114 (also known as main storage or main memory) may be executed natively in a z/Architecture IBM Server, PowerPC IBM server, or alternatively, in machines executing other architectures. They can be emulated in the existing and in future IBM servers and on other machines of IBM (e.g., pSeries® Servers and xSeries® Servers). They can be executed in machines where generally execution is in an emulation mode.

In emulation mode, the specific instruction being emulated is decoded, and a subroutine is built to implement the individual instruction, as in a C subroutine or driver, or some other technique is used for providing a driver for the specific hardware, as is within the skill of those in the art after understanding the description of an embodiment of the invention.

Moreover, the various embodiments described above are just examples. There may be many variations to these embodiments without departing from the spirit of the present invention. For instance, although a logically partitioned environment may be described herein, this is only one example. Aspects of the invention are beneficial to many types of environments, including other environments that have a plurality of zones, and non-partitioned environments. Further, there may be no central processor complexes, but yet, multiple processors coupled together. Yet further, one or more aspects of the invention are applicable to single processor environments.

Although particular environments are described herein, again, many variations to these environments can be implemented without departing from the spirit of the present invention. For example, if the environment is logically partitioned, then more or fewer logical partitions may be included in the environment. Further, there may be multiple central processing complexes coupled together. These are only some of the variations that can be made without departing from the spirit of the present invention. Additionally, other variations are possible. For example, although the controller described herein serializes the instruction so that one IDTE instruction executes at one time, in another embodiment, multiple instructions may execute at one time. Further, the environment may include multiple controllers. Yet further, multiple quiesce requests (from one or more controllers) may be concurrently outstanding in the system. Additional variations are also possible.

As used herein, the term "processing unit" includes pageable entities, such as guests; processors; emulators; and/or other similar components. Moreover, the term "by a processing unit" includes on behalf of a processing unit. The term "buffer" includes an area of storage, as well as different types of data structures, including, but not limited to, arrays; and the term "table" can include other than table type data structures. Further, the instruction can include other than registers to designate information. Moreover, a page, a segment and/or a region can be of sizes different than those described herein.

One or more of the capabilities of the present invention can be implemented in software, firmware, hardware, or some combination thereof. Further, one or more of the capabilities can be emulated.

One or more aspects of the present invention can be included in an article of manufacture (e.g., one or more computer program products) having, for instance, computer usable media. The media has embodied therein, for instance, computer readable program code means or logic (e.g., instructions, code, commands, etc.) to provide and facilitate the capabilities of the present invention. The article of manufacture can be included as a part of a computer system or sold separately. The media (also known as a tangible storage medium) may be implemented on a storage device 120 as fixed or portable media, in read-only-memory (ROM) 116, in random access memory (RAM) 114, or stored on a computer chip of a CPU (110), an I/O adapter 118 for example.

Additionally, at least one program storage device 120 comprising storage media, readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer implemented method for maintaining liveness information for executing programs, the method comprising:
    maintaining, by a processor, current operand state information indicating whether corresponding current operands will be used again, wherein current operands that will be used again are enabled for use by a first program module and current operands that will not be used again are disabled for use by the first program module, the first program module comprising machine instructions of an instruction set architecture (ISA), the first program module currently being executed by the processor;
    accessing a current operand by a machine instruction of said first program module, the accessing comprising using the current operand state information to determine whether a previously stored current operand value is accessible by the first program module; and
    based on the current operand being disabled, the accessing comprising at least one of a) and b) comprising:
    a) returning an architecture-specified value as the value of the current operand, where the architecture-specified value is any one of an undefined value, a zero value, a value consisting of all '1's, or a program specified default value; and
    b) performing a notification, wherein the notification is any one of raising an exception, suppressing an exception, raising and suppressing an exception under control of a machine state, providing debug information, and setting at least one register to indicate occurrence of an access to a disabled operand,
    wherein the current operand state information further comprises an operand enablement control for controlling whether current operand state information can be changed between enabled and disabled by a current program.

2. The method according to claim 1, further comprising:
    transferring program execution from the first program module to a second program module, comprising performing a) through b):
    a) saving the current operand state information of the first program module in a context switch save area; and
    b) loading, from the context switch save area, new operand state information as current operand state information of a second program to be executed; and
    initiating execution of the second program using the loaded current operand state information.

3. The method according to claim 2, wherein the transferring program execution is a context switch operation, wherein the current operands consist of any one of architected general register values of general registers identified by instructions or architected floating point register values of floating point registers identified by instructions, wherein the transferring program execution further comprises performing c) through d):
    c) saving a program counter value and current operand values of enabled current operands of the first program module in the context switch save area; and
    d) loading, from the context switch save area, new operand values of new enabled operands as current operand values of current operands of the second program to be executed, wherein the initiated execution of the second program uses the loaded current operands.

4. The method according to claim 1, further comprising:
    executing a first operand disable instruction, the executing causing current operand state information of a first operand to disable the first operand, wherein reads of disabled operands return an architecture dependent default value; and
    executing a second operand enable instruction, the latter executing causing current operand state information of a second operand to enable the second operand, wherein reads of enabled operands return values previously stored to said enabled operands.

5. The method according to claim 4, wherein the default value consists of any one of an architecture undefined value, a value previously stored in an architecture defined default value register, all 1's, all 0's, an incremented value or a decremented value, wherein the incremented value is incremented with each read access, wherein the decremented value is decremented with each read access.

6. The method according to claim 4, wherein the first operand disable instruction is a prefix instruction, the execution of the prefix instruction indicating to the processor that the first operand is to be disabled after use by a next sequential instruction following the prefix instruction in program order.

7. The method according to claim 4, wherein write operations to disabled operands cause the disabled operand to be enabled, wherein the second operand enable instruction is a write instruction for writing to the second operand.

* * * * *